United States Patent
Takagaki et al.

(10) Patent No.: US 12,458,871 B2
(45) Date of Patent: Nov. 4, 2025

(54) INPUT DEVICE, CONTROLLER, AND ERROR DETECTION METHOD

(71) Applicant: Asahi Kasei Microdevices Corporation, Tokyo (JP)

(72) Inventors: Kosuke Takagaki, Tokyo (JP); Kazuyuki Iguchi, Tokyo (JP)

(73) Assignee: Asahi Kasei Microdevices Corporation, Tokyo (JP)

( * ) Notice: Subject to any disclaimer, the term of this patent is extended or adjusted under 35 U.S.C. 154(b) by 263 days.

(21) Appl. No.: 18/333,511

(22) Filed: Jun. 12, 2023

(65) Prior Publication Data

US 2023/0321526 A1    Oct. 12, 2023

Related U.S. Application Data

(63) Continuation of application No. PCT/JP2021/044961, filed on Dec. 7, 2021.

(30) Foreign Application Priority Data

Dec. 14, 2020 (JP) .................................. 2020-207047

(51) Int. Cl.
  *A63F 13/21*   (2014.01)
  *A63F 13/24*   (2014.01)
(52) U.S. Cl.
  CPC .............. *A63F 13/21* (2014.09); *A63F 13/24* (2014.09)
(58) Field of Classification Search
  CPC ......... A63F 13/21; A63F 13/24; G05G 9/047; G06F 3/0338; H01H 25/04; H01H 25/06
  (Continued)

(56) References Cited

U.S. PATENT DOCUMENTS

| | | | |
|---|---|---|---|
| 4,459,578 A | | 7/1984 | Sava |
| 5,543,720 A | * | 8/1996 | Edvardsson ............ G01S 13/08 324/637 |

(Continued)

FOREIGN PATENT DOCUMENTS

| | | |
|---|---|---|
| JP | H11249807 A | 9/1999 |
| JP | 2000003651 A | 1/2000 |

(Continued)

OTHER PUBLICATIONS

International Search Report and Written Opinion (ISA/237) of the International Search Authority for International Patent Application No. PCT/JP2021/044961, mailed by the Japan Patent Office on Feb. 8, 2022.

*Primary Examiner* — Pierre E Elisca

(57) ABSTRACT

There is provided an input device including a magnet that generates a magnetic field; a sensor for detecting the magnetic field generated by the magnet; and a magnet moving unit for moving a position of the magnet in a predetermined first plane, in which the magnet includes a first magnet and a second magnet, the sensor is provided in a region different from a region in which the magnet moves in a top view with respect to the first plane, the magnet moving unit is configured to move the first magnet in a predetermined first direction in the first plane, and move the second magnet in a second direction different from the first direction in the first plane, the first direction and the second direction are orthogonal to each other in the first plane, and the sensor is provided in common to the first magnet and the second magnet.

22 Claims, 24 Drawing Sheets

(58) Field of Classification Search
USPC .......................................................... 463/37
See application file for complete search history.

(56) References Cited

U.S. PATENT DOCUMENTS

| | | | | |
|---|---|---|---|---|
| 5,805,140 | A | * | 9/1998 | Rosenberg ......... G05B 19/4207 |
| | | | | 345/161 |
| 8,167,720 | B2 | * | 5/2012 | Sugioka ................ G06F 3/0346 |
| | | | | 463/36 |
| 10,635,188 | B2 | * | 4/2020 | Tompkins ............. A63F 13/213 |
| 2005/0264530 | A1 | | 12/2005 | Takatsuka |
| 2006/0050053 | A1 | | 3/2006 | Takatsuka |
| 2008/0280640 | A1 | | 11/2008 | Wedel |
| 2012/0260760 | A1 | | 10/2012 | Terao |
| 2016/0334830 | A1 | * | 11/2016 | Sirohiwala ............. G01D 5/145 |
| 2017/0368451 | A1 | * | 12/2017 | Tiffany ................... A63F 13/22 |
| 2019/0041894 | A1 | * | 2/2019 | Parazynski .............. G05G 1/04 |
| 2020/0089334 | A1 | * | 3/2020 | Tompkins ............. A63F 13/213 |
| 2020/0300665 | A1 | | 9/2020 | Shunji |
| 2022/0055582 | A1 | | 2/2022 | Takimoto |
| 2024/0386817 | A1 | * | 11/2024 | Sauers ................. G06T 19/006 |

FOREIGN PATENT DOCUMENTS

| | | | |
|---|---|---|---|
| JP | 2002181505 | A | 6/2002 |
| JP | 2013065398 | A | 4/2013 |
| JP | 2016207634 | A | 12/2016 |
| JP | 2018189512 | A | 11/2018 |

\* cited by examiner

INPUT DEVICE, CONTROLLER, AND ERROR DETECTION METHOD

The contents of the following patent application(s) are incorporated herein by reference:
NO. 2020-207047 filed in JP on Dec. 14, 2020, and
NO. PCT/JP2021/044961 filed in WO on Dec. 7, 2021

BACKGROUND

1. Technical Field

The present invention relates to an input device, a controller, and an error sensing method.

2. Related Art

In the related art, there is known an input device for inputting a signal in accordance with an operation of an operation unit (for example, refer to Patent Document 1).
Patent Document 1: Japanese Patent Application Publication No. 2012-221342
Patent Document 2: Japanese Patent Application Publication No. 2013-065398
Patent Document 3: Japanese Patent Application Publication No. 2016-207634

DESCRIPTION OF EXEMPLARY EMBODIMENTS

Hereinafter, the present invention will be described through embodiments of the invention, but the following embodiments do not limit the invention according to claims. In addition, not all of the combinations of features described in the embodiments are essential to the solution of the invention.

Figure 1A:
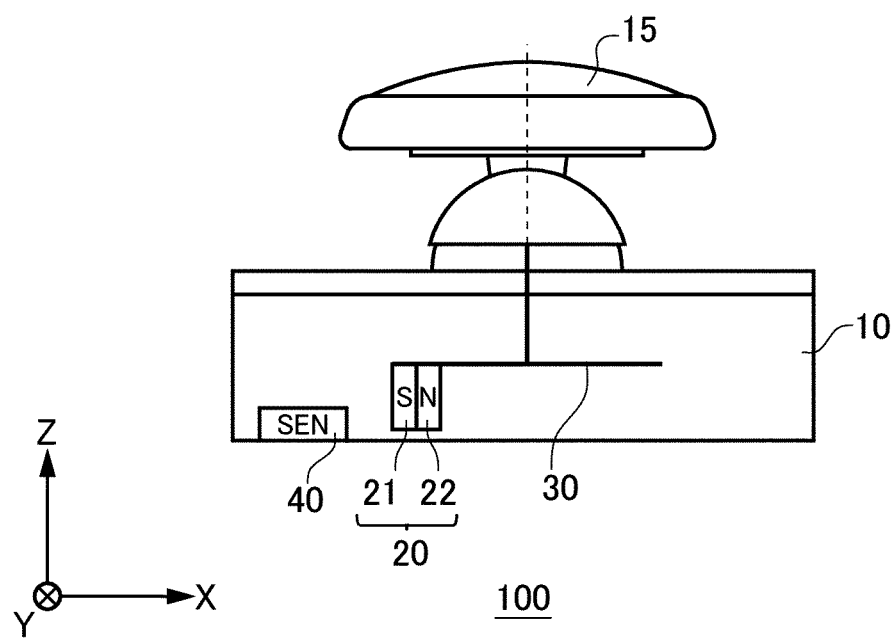
FIG. 1A shows an example of a side view of an input device 100.

FIG. 1A shows an example of a side view of an input device 100. The input device 100 includes a housing 10, an operation unit 15, a magnet 20, a magnet moving unit 30, and a sensor 40. The input device 100 is mounted on a controller or the like for a video game, and is a device for inputting a signal in accordance with an operation of the operation unit 15.

In the present specification, technical matters may be described with orthogonal coordinate axes consisting of an X axis, a Y axis, and a Z axis. In the present specification, a plane in which the operation unit 15 moves is set as a first plane (that is, an XY plane), and a direction perpendicular to the first plane (a Z axis direction) is set as a height direction of the input device 100. It should be noted that in the present specification, a view from a positive side to a negative side in the Z axis direction may be referred to as a top view.

The housing 10 houses the magnet 20, the magnet moving unit 30, and the sensor 40. A shape of the housing 10 of the present example is a rectangular parallelepiped, but is not limited to this. The housing 10 has a shape which is able to be embedded according to the controller that is mounted.

The operation unit 15 is a member that has a protruding shape and that can be operated up, down, right, and left. The operation unit 15 can be tilted in any direction by the operation. The operation unit 15 operates the magnet 20 by the magnet moving unit 30 according to a tilting operation. The operation unit 15 may be pushed in the Z axis direction in addition to up, down, left, and right tilting operations corresponding to the XY plane. In an example, a material of the operation unit 15 is insulating resin.

The magnet 20 has a first pole 21 and a second pole 22, and generates a magnetic field of predetermined magnitude. In the present example, the first pole 21 is a south pole and the second pole 22 is a north pole. The magnet 20 may be a magnet such as a neodymium magnet or a ferrite magnet. The magnet 20 is fixed to an end portion of the magnet moving unit 30. In the present example, the first pole 21 is arranged at a position close to the sensor 40, and the second pole 22 is arranged at a position away from the sensor 40; however, the first pole 21 and the second pole 22 may be arranged vice versa. The shape of the magnet 20 of the present example is a rectangular parallelepiped, but is not limited to this.

The first pole 21 and the second pole 22 are arrayed in a predetermined direction in the XY plane. The first pole 21 and the second pole 22 may be arrayed in an X axis direction or a Y axis direction. It should be noted that the first pole 21 and the second pole 22 may be arrayed in the Z axis direction. The X axis direction is an example of a first direction, and the Y axis direction is an example of a second direction.

The magnet moving unit 30 moves the magnet 20 in conjunction with the operation by the operation unit 15. The magnet moving unit 30 of the present example moves the magnet 20 to a direction and a position which are in accordance with the tilting of the operation unit 15. The magnet moving unit 30 of the present example functions as a slider that converts the tilting operation of the operation unit 15 into a movement of the magnet 20 in the XY plane.

The sensor 40 detects the magnetic field generated by the magnet 20. The sensor 40 of the present example outputs, as magnetic field data, a change in the magnetic field in accordance with the movement of the magnet 20. By processing the magnetic field data output by the sensor 40, it is possible to detect the movement of the magnet 20. The sensor 40 may be a three-axis magnetic sensor capable of detecting magnetic fields in three axes, or may be a single-axis magnetic sensor or a two-axis magnetic sensor. The sensor 40 of the present example is arranged on a bottom surface of the housing 10, but may be arranged above the bottom surface of the housing 10. In a case where the sensor 40 is arranged on the bottom surface of the housing 10, it is easier to improve workability during mounting than in a case where the sensor 40 is arranged on a side surface of the housing 10.

Figure 1B:
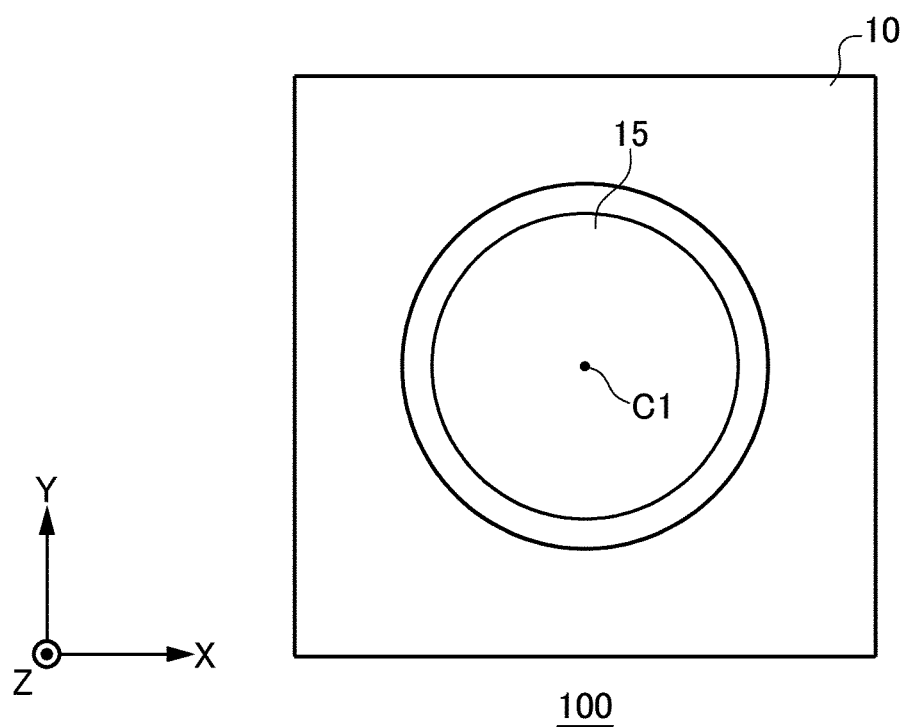
FIG. 1B shows an example of a top plan view of the input device 100.

FIG. 1B shows an example of a top plan view of the input device 100. The shape of the operation unit 15 is substantially circular in the top view. The operation unit 15 of the present example has a shape suitable for being operated with a finger; however, the shape of the operation unit 15 is not limited to the present example. The center C1 indicates the center position of the operation unit 15 at a reference position. The reference position of the operation unit 15 is a position of the operation unit 15 in a state in which the operation unit 15 is not tilted. The center C1 of the operation unit 15 may be arranged to coincide with the center of the housing 10 in the XY plane, or may be arranged to be shifted from the center of the housing 10 in the XY plane.

Figure 2A:
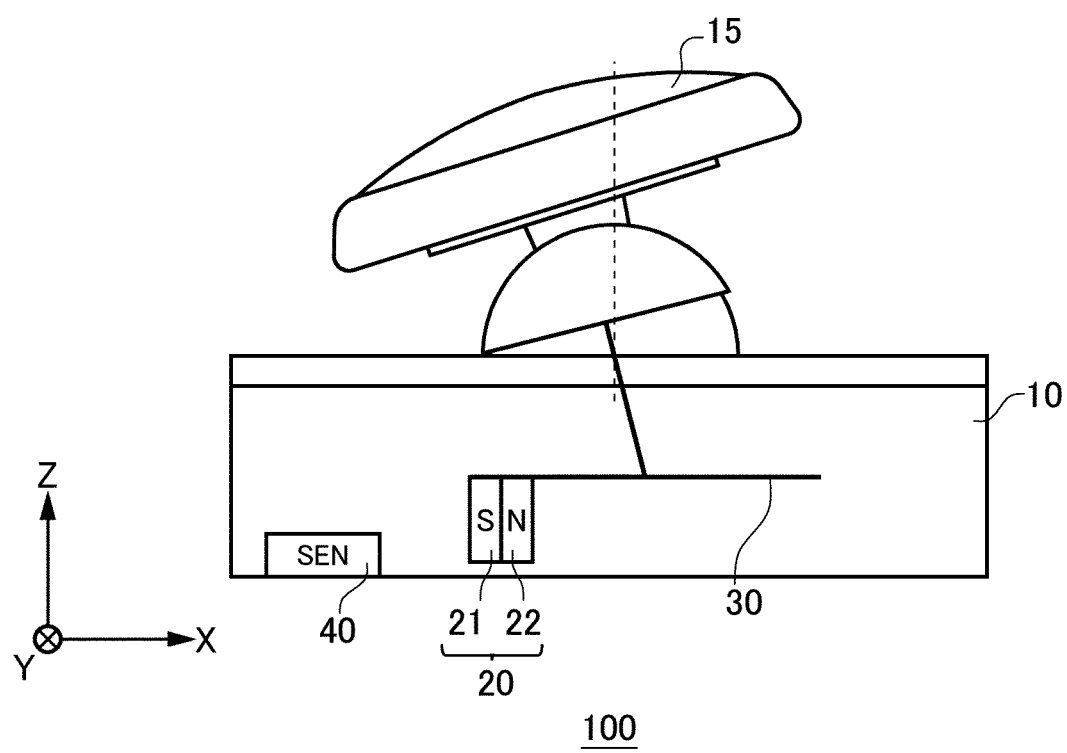
FIG. 2A shows an example of a side view of the input device 100 in a state in which an operation unit 15 is tilted.

FIG. 2A shows an example of a side view of the input device 100 in a state in which an operation unit 15 is tilted. The input device 100 of the present example shows a state in which the operation unit 15 is tilted to a negative side in the X axis direction. By tilting the operation unit 15 to the negative side in the X axis direction, the magnet 20 moves to a positive side in the X axis direction and slides in a direction away from the sensor 40. The sensor 40 acquires the magnetic field data of the magnetic field which is weakened due to the magnet 20 being away. This makes it possible for the input device 100 to know that the operation unit 15 is tilted to the negative side in the X axis direction.

Figure 2B:
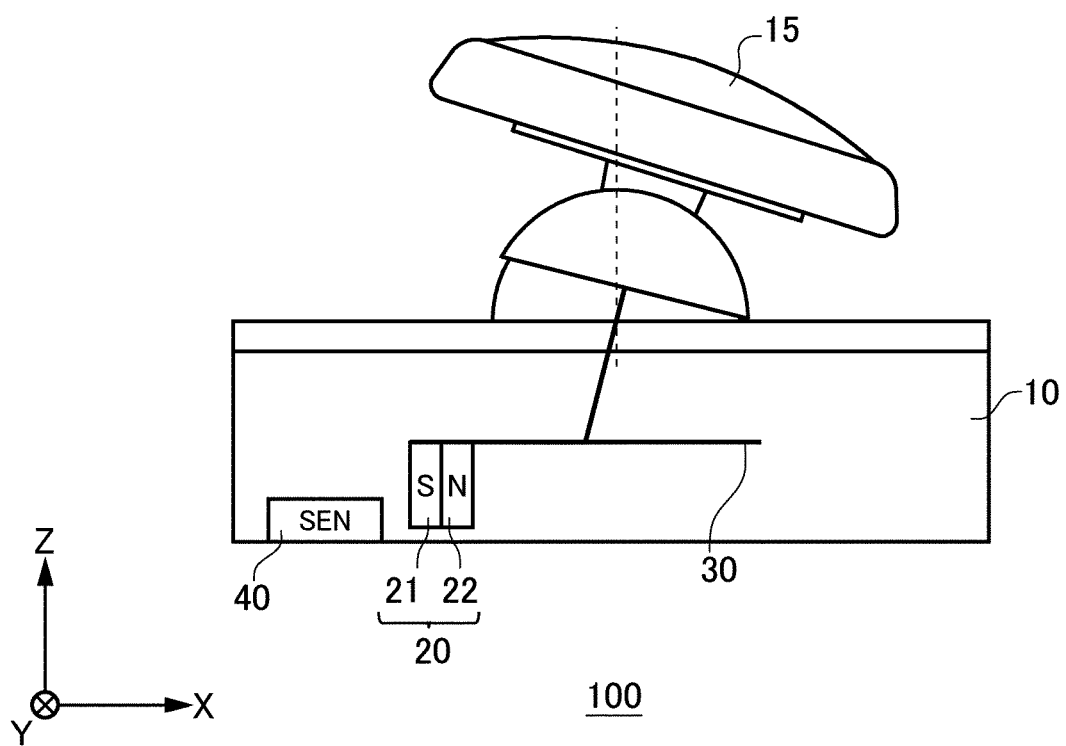
FIG. 2B shows an example of an operation of the input device 100 in a state in which the operation unit 15 is tilted.

FIG. 2B shows an example of an operation of the input device 100 in a state in which the operation unit 15 is tilted. The input device 100 of the present example shows a state in which the operation unit 15 is tilted to the positive side in the X axis direction. By tilting the operation unit 15 to the positive side in the X axis direction, the magnet 20 moves to the negative side in the X axis direction and slides in an approaching direction to the sensor 40. The sensor 40 acquires the magnetic field data of the magnetic field which is strengthened due to the magnet 20 approaching. This makes it possible for the input device 100 to know that the operation unit 15 is tilted to the positive side in the X axis direction.

A distance between the magnet 20 and the sensor 40 is set such that the change in the magnetic field generated by the magnet 20 can be sensed by the sensor 40 even when the distance changes by such a tilting operation of the operation unit 15. The distance between the magnet 20 and the sensor 40 may be appropriately adjusted according to the magnitude of the magnetic field generated by the magnet 20, a characteristic required of the input device 100, a measurement range of the sensor 40, or the like.

The input device 100 of the present example is of a non-contact type for detecting the magnetic field data in accordance with the tilting operation of the operation unit 15 by a magnetic detection by using the sensor 40, and thus a sensor unit and a moving unit do not contact with each other and no mechanical wear occurs between the two units. In addition, a configuration for detecting the magnetic data has a resistance to dust and a resistance to water, by which it is difficult to be affected by the dust and the water, and thus there is no problem in injecting a lubricant or the like for a smooth movement of the moving unit, for example. It should be noted that in the present example, the case where the magnet 20 is moved by the magnet moving unit 30 according to a component by which the operation unit 15 is tilted in the X axis direction, is described; however, the same may be applied to other directions such as the Y axis direction.

Figure 3A:
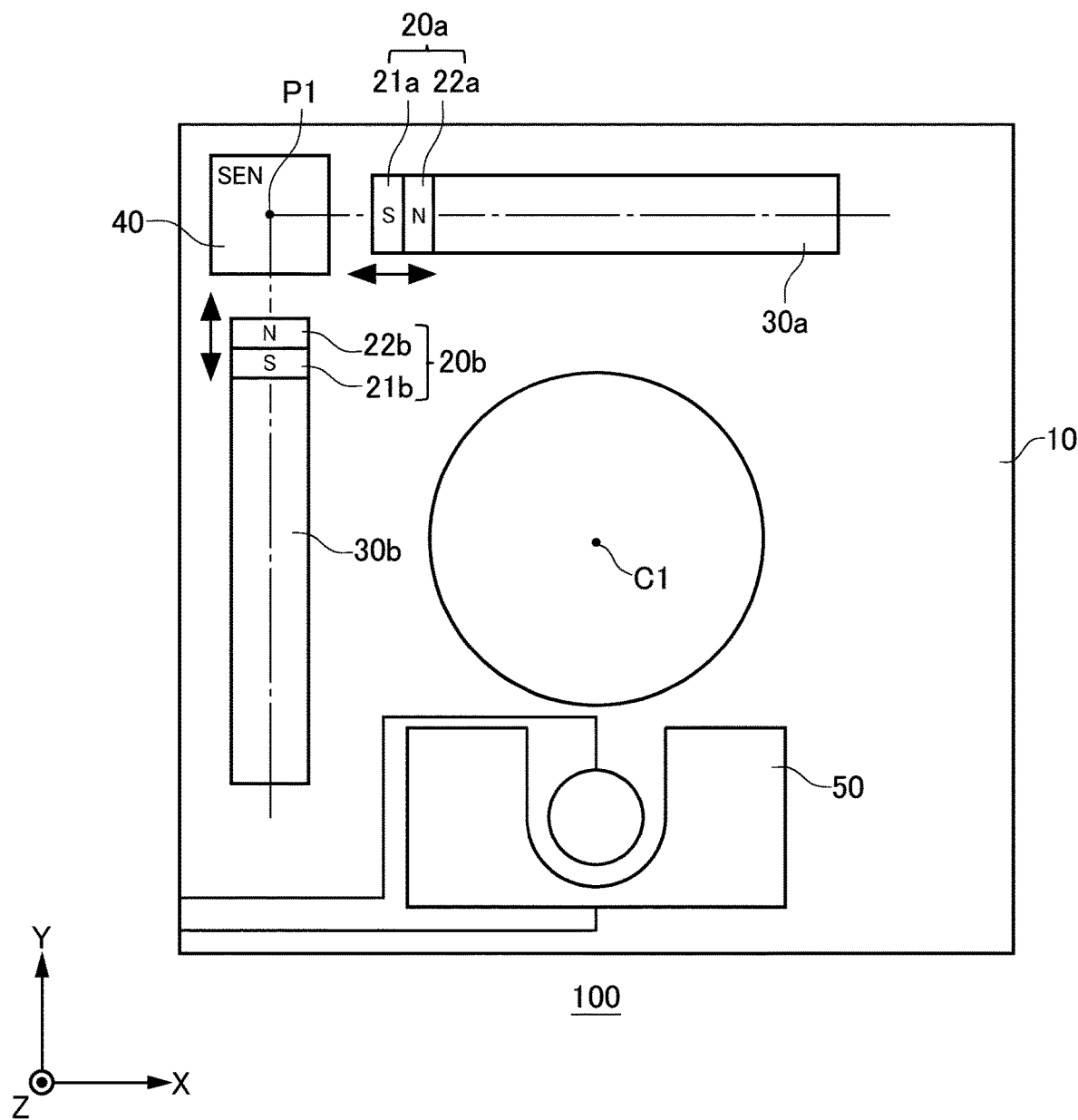
FIG. 3A is the top plan view of the input device 100 showing an internal structure of a housing 10.

FIG. 3A is the top plan view of the input device 100 showing an internal structure of a housing 10. The input device 100 of the present example detects, by the one sensor 40, movements of two magnets 20 that move in the X axis direction or the Y axis direction. The input device 100 of the present example includes total two of a magnet 20a and a magnet 20b, and total two of a magnet moving unit 30a and a magnet moving unit 30b. The magnet 20a is an example of a first magnet. The magnet 20b is an example of a second magnet. The input device 100 of the present example includes a sensing unit 50.

The housing 10 has a substantially square shape in the XY plane. The magnet 20, the magnet moving unit 30, the sensor 40, and the sensing unit 50 are arranged around the operation unit 15 provided near the center of the housing 10. A layout in the housing 10 is not limited to the present example, and may be changed in consideration of wiring or the like for connecting the sensor 40 or the sensing unit 50 to an outside.

The magnet moving unit 30a moves the magnet 20a in the X axis direction in the XY plane. The magnet moving unit 30a of the present example slides the magnet 20a in the X axis direction in conjunction with the movement of the operation unit 15 in the X axis direction. The magnet moving unit 30a of the present example is arranged along a side of the housing 10 on a positive side in the Y axis direction further than the center C1 of the operation unit 15.

The magnet moving unit 30b moves the magnet 20b in the Y axis direction in the XY plane. The magnet moving unit 30b of the present example slides the magnet 20b in the Y axis direction in conjunction with the movement of the operation unit 15 in the Y axis direction. The magnet moving unit 30b of the present example is arranged along a side of the housing 10 on the negative side in the X axis direction further than the center C1 of the operation unit 15.

In the present example, the first direction (that is, the X axis direction) and the second direction (that is, the Y axis direction) are orthogonal to each other in the first plane (that is, the XY plane). However, an angle formed by the first direction and the second direction in the first plane may be an acute angle, or may be an obtuse angle. Even in such a case, it is possible to acquire the state of the operation unit 15 from the magnetic field data by changing a method for processing the magnetic field data of the sensor 40.

The sensor 40 is provided in common to the magnet 20a and the magnet 20b. That is, the sensor 40 of the present example respectively detects the magnetic field in accordance with the position of the magnet 20a, and the magnetic field in accordance with the position of the magnet 20b. The sensor 40 is provided on the negative side of the magnet moving unit 30a in the X axis direction and on the positive side of the magnet moving unit 30b in the Y axis direction. For example, the sensor 40 detects the position of the magnet 20a from the change in the magnetic field in the X axis direction, and detects the position of the magnet 20b from the change in the magnetic field in the Y axis direction.

The sensor 40 of the present example is provided, in the top view, at an intersection point P1 between the first direction in which the magnet 20a moves and the second direction in which the magnet 20b moves. In the top view, the sensor 40 may be arranged to center on the intersection point P1, or may be arranged to include at least the intersection point P1. In the input device 100 of the present example, it is possible to reduce a size of the input device 100 by providing the sensor 40 in common for a plurality of magnets 20.

In addition, in the top view, the sensor 40 of the present example is provided in a region different from a region in which the magnet 20 moves. In the top view, the sensor 40 is not provided directly below the operation unit 15, and is provided at a position shifted from the center C1 in the XY plane. Accordingly, it is difficult for the input device 100 to be affected by the pushing operation of the operation unit 15 in the Z axis direction. This makes it possible to reduce a thickness of the input device 100 of the present example because the input device 100 does not need to secure a thickness greater than or equal to a thickness for the pushing operation in the Z axis direction. On the other hand, when the sensor is provided below the center C1 of the operation unit 15, the sensor may be affected by the pushing operation of the operation unit 15 in the Z axis direction, which makes it difficult to reduce the thickness.

The sensing unit 50 senses a component in the Z axis direction corresponding to the pushing operation of the operation unit 15. For example, the sensing unit 50 includes a tactile switch for sensing the pushing, and outputs detection data in accordance with the pushing operation. When the pushing operation of the operation unit 15 is not detected, the sensing unit 50 may be omitted. The detection data from the sensing unit 50 may be processed by the same processing unit as a processing unit for the magnetic field data of the sensor 40.

It should be noted that in the magnet 20a of the present example, the first pole 21a is arranged at a position close to the sensor 40, and the second pole 22a is arranged at a position away from the sensor 40. In addition, in the magnet 20b of the present example, the second pole 22b is arranged at a position close to the sensor 40, and the first pole 21b is arranged at a position away from the sensor 40. That is, in the input device 100 of the present example, the magnets 20 are arranged in an attraction arrangement to attract each other when approaching the sensor 40, but may be arranged in a repulsion arrangement, which will be described below.

Figure 3B:
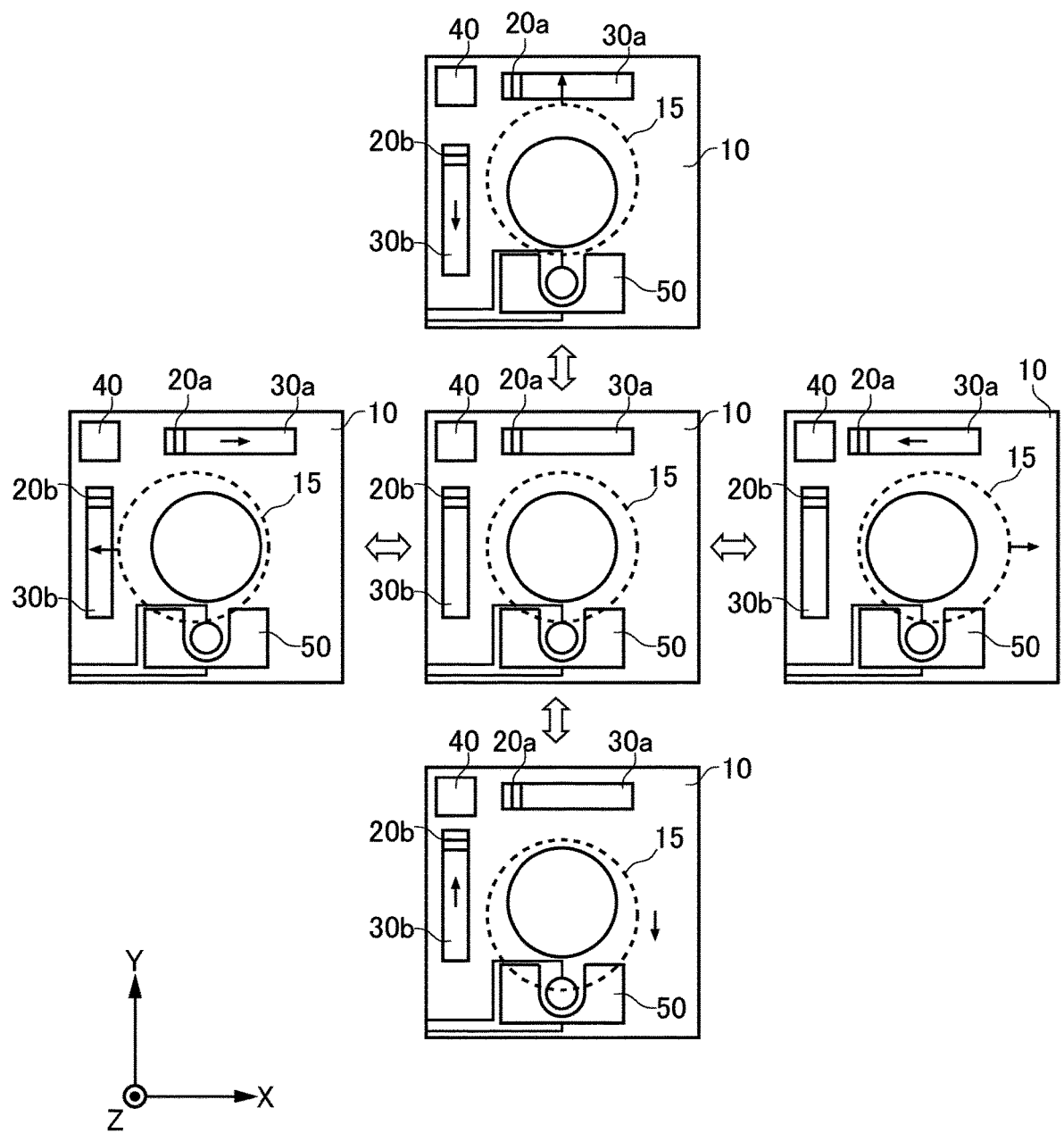
FIG. 3B shows an example of the operation of the input device 100.

FIG. 3B shows an example of the operation of the input device 100. FIG. 3B shows how the position of the magnet 20 changes in accordance with the operation of the operation unit 15. When the operation unit 15 is at the reference position, the magnet 20a and the magnet 20b are also arranged at the respective reference positions. When the operation unit 15 is tilted, the position of the magnet 20 changes in conjunction with the tilting of the operation unit 15. For example, when the operation unit 15 is tilted to the positive side in the X axis direction, the magnet 20a moves to the negative side in the X axis direction. In addition, when the operation unit 15 is tilted to the positive side in the Y axis direction, the magnet 20b moves to the negative side in the Y axis direction.

It should be noted that in the present example, the case where the operation unit 15 is tilted in any of the X axis direction or the Y axis direction, is shown; however, the operation unit 15 may be tilted obliquely with respect to the X axis direction and the Y axis direction. In this case as well, similarly, the magnet 20a and the magnet 20b move according to a component in the X axis direction and a component in the Y axis direction, respectively, and the operation of the operation unit 15 can be sensed.

Figure 4:
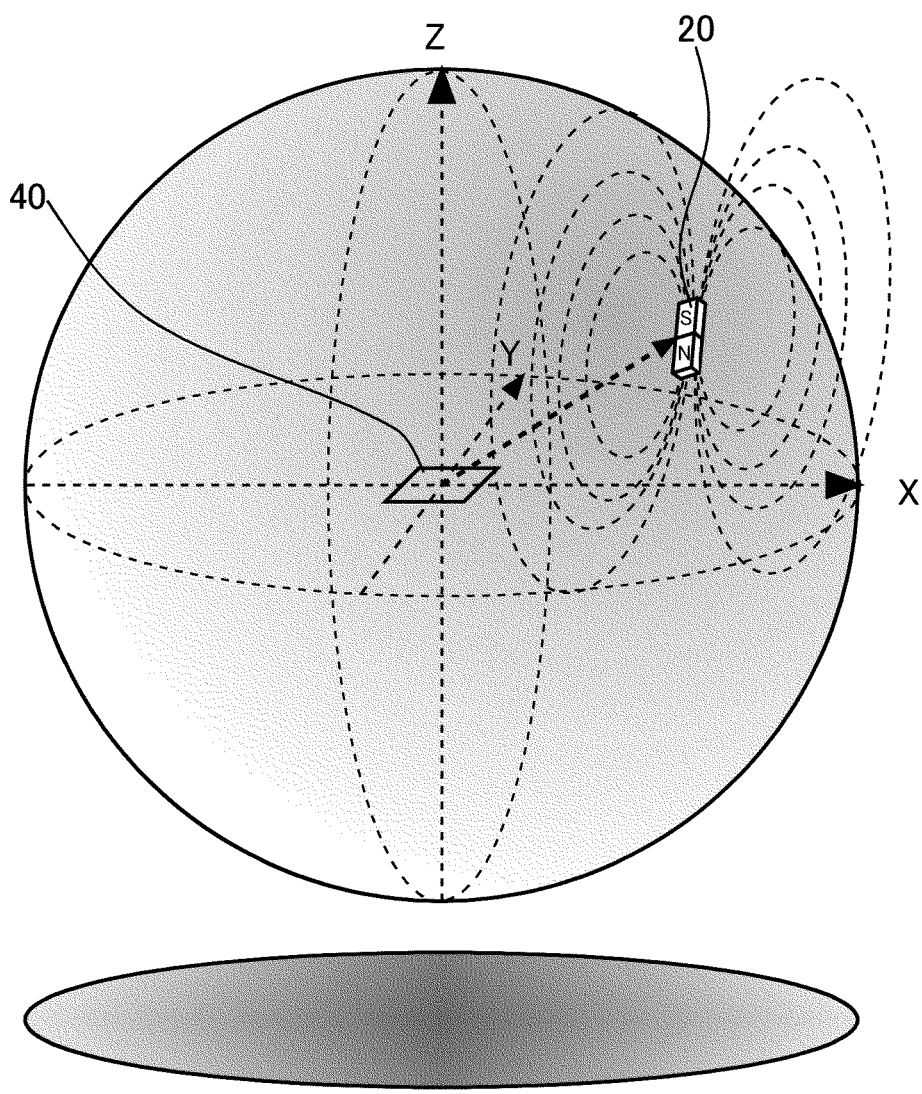
FIG. 4 shows an example of a sensor 40 capable of detecting magnetic fields in three axes.

FIG. 4 shows an example of a sensor 40 capable of detecting magnetic fields in three axes. The sensor 40 of the present example functions as the three-axis magnetic sensor for detecting the magnetic fields in three axes. When the sensor 40 detects the magnetic fields in at least two axes in the XY plane, the sensor 40 can acquire the magnetic field data in accordance with the two-dimensional operation by the operation unit 15. Therefore, in a case where the sensor 40 is the three-axis magnetic sensor, two axes can be used to detect the operation of the operation unit 15, and the remaining axis can be used for another purpose such as a disturbance detection. It should be noted that the sensor 40 may be configured to include two single-axis magnetic sensors each of which detects the magnetic field in a single-axis, or may be configured to include one two-axis magnetic sensor that detects the magnetic fields in two axes.

Figure 5A:
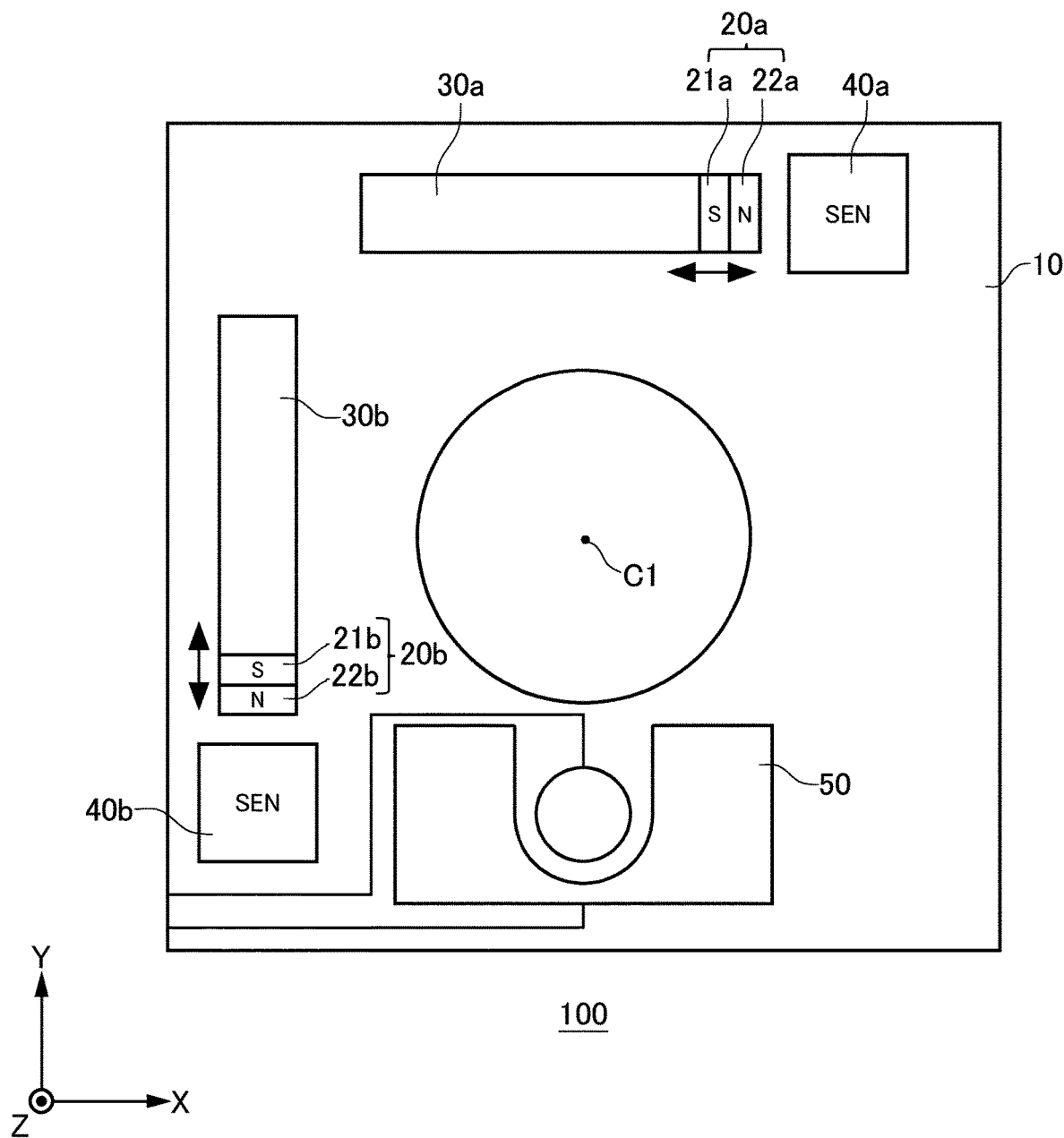
FIG. 5A shows a modification example of the input device 100.

FIG. 5A shows a modification example of the input device 100. The input device 100 of the present example includes total two of a sensor 40a and a sensor 40b, which is a difference from the example embodiment of FIG. 3A. The input device 100 of the present example detects, by the two sensors 40, the movements of two magnets 20 that move in the X axis direction or the Y axis direction.

The sensor 40a is provided on the positive side of the magnet moving unit 30a in the X axis direction, and detects the change in the magnetic field in accordance with the position of the magnet 20a. The sensor 40a may be a single-axis sensor for detecting the change in the magnetic field in accordance with the position of the magnet 20a, or may be a multi-axis sensor. The sensor 40a is an example of a first sensor for detecting the magnetic field of the magnet 20a.

The sensor 40b is provided on the negative side of the magnet moving unit 30b in the Y axis direction, and detects the change in the magnetic field in accordance with the position of the magnet 20b. The sensor 40b may be a single-axis sensor for detecting the change in the magnetic field in accordance with the position of the magnet 20b, or may be a multi-axis sensor. The sensor 40b is an example of a second sensor for detecting the magnetic field of magnet 20b.

In the top view, the sensor 40a and the sensor 40b of the present example are provided in a region different from the region in which the magnet 20a or the magnet 20b moves. In addition, in the top view, the sensor 40a and the sensor 40b are respectively provided at asymmetrical positions with respect to the center C1 of the operation unit 15. That is, the sensor 40a and the sensor 40b are not provided below the center C1 of the operation unit 15. This makes it possible to reduce the thickness of the input device 100.

In addition, the plurality of magnets 20 of the present example are provided at positions away from each other in the top view. Accordingly, the input device 100 of the present example can reduce influences of an attractive force and a repulsive force between the magnets 20, and suppress an influence on an operational feeling by the operation unit 15.

Figure 5B:
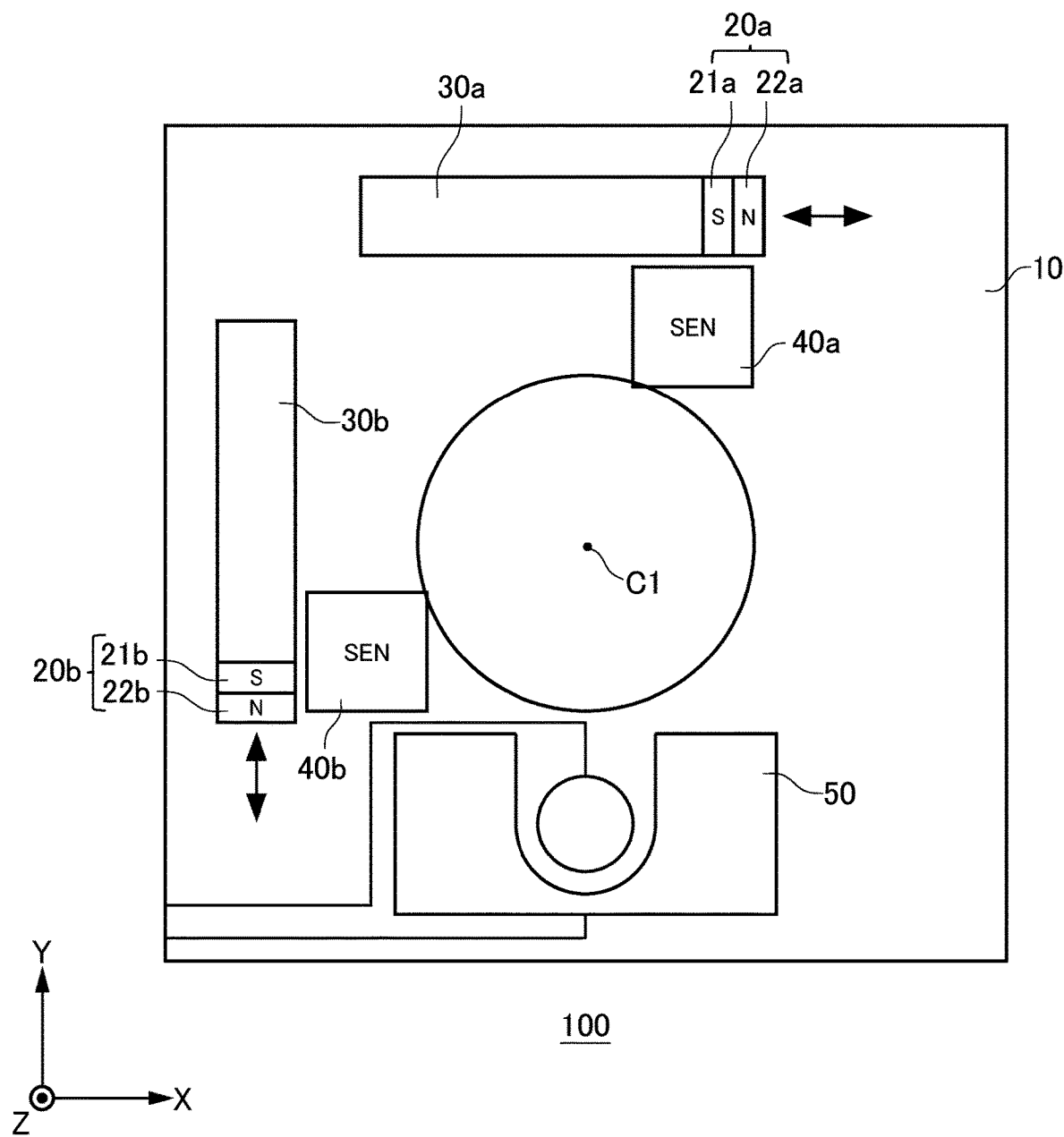
FIG. 5B shows a modification example of the input device 100.

FIG. 5B shows a modification example of the input device 100. The input device 100 of the present example is different from the example embodiment of FIG. 5A in the positions of the total two of the sensor 40a and the sensor 40b.

The sensor 40a is arranged on a side of the magnet 20a that moves. In a case where the magnet 20a moves in the X axis direction, the sensor 40a of the present example is arranged on the negative side in the Y axis direction further than the magnet 20a. That is, the sensor 40a is arranged on the negative side in the Y axis direction further than the magnet moving unit 30a.

Similarly, sensor 40b is arranged on a side of the moving magnet 20b. In a case where the magnet 20b moves in the Y axis direction, the sensor 40b of the present example is arranged on the positive side in the X axis direction further than the magnet 20b. That is, the sensor 40b is arranged on the positive side in the X axis direction further than the magnet moving unit 30b. This makes it possible for a stroke of the magnet 20 to be long, and a degree of freedom in a layout of the input device 100 is increased, and the size of the input device 100 is easily realized.

Figure 5C:
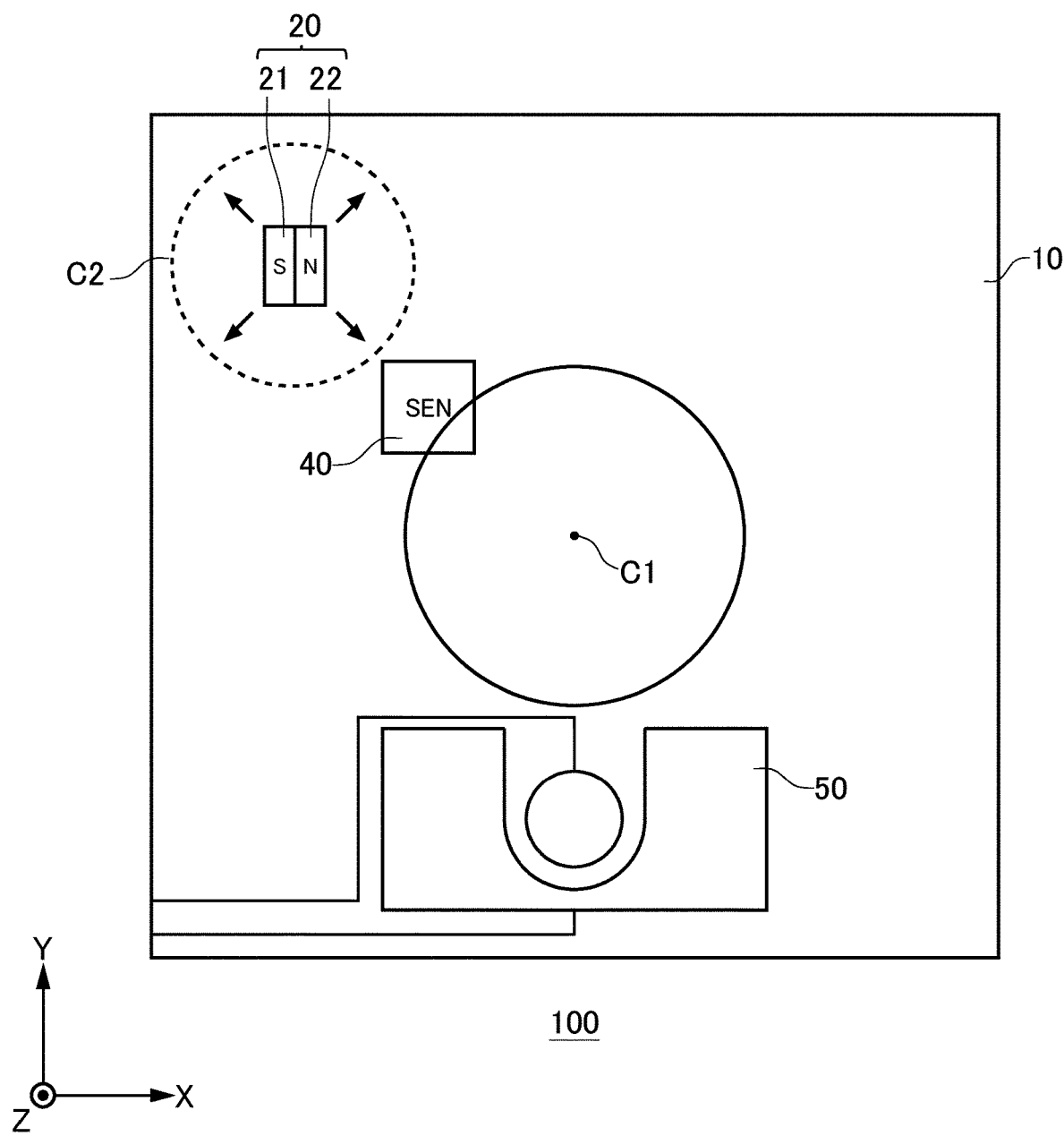
FIG. 5C shows a modification example of the input device 100.

FIG. 5C shows a modification example of the input device 100. The input device 100 of the present example includes the one sensor 40, and the one magnet 20 provided in an outer periphery of the sensor 40. The input device 100 of the present example detects, by the one sensor 40, the movement of the one magnet 20 that moves in the XY plane.

In the top view, the sensor 40 of the present example is provided in a region different from the region in which the magnet 20 moves. The sensor 40 is provided near the operation unit 15 in the top view, but is not limited to this. In the top view, the sensor 40 of the present example is provided near a predetermined circle C2 in which the magnet 20 is arranged.

The magnet 20 is provided in the predetermined circle C2 in the top view. The magnet 20 of the present example moves on an outer periphery of and inside the circle C2 according to the tilting operation of the operation unit 15. Note that the magnet 20 may be deviated from the circle C2, and move in any region in the XY plane. It should be noted that the magnet moving unit 30 of the present example is not shown. The input device 100 of the present example can sense the movement of the operation unit 15 by including the one magnet 20 and the one sensor 40.

Figure 5D:
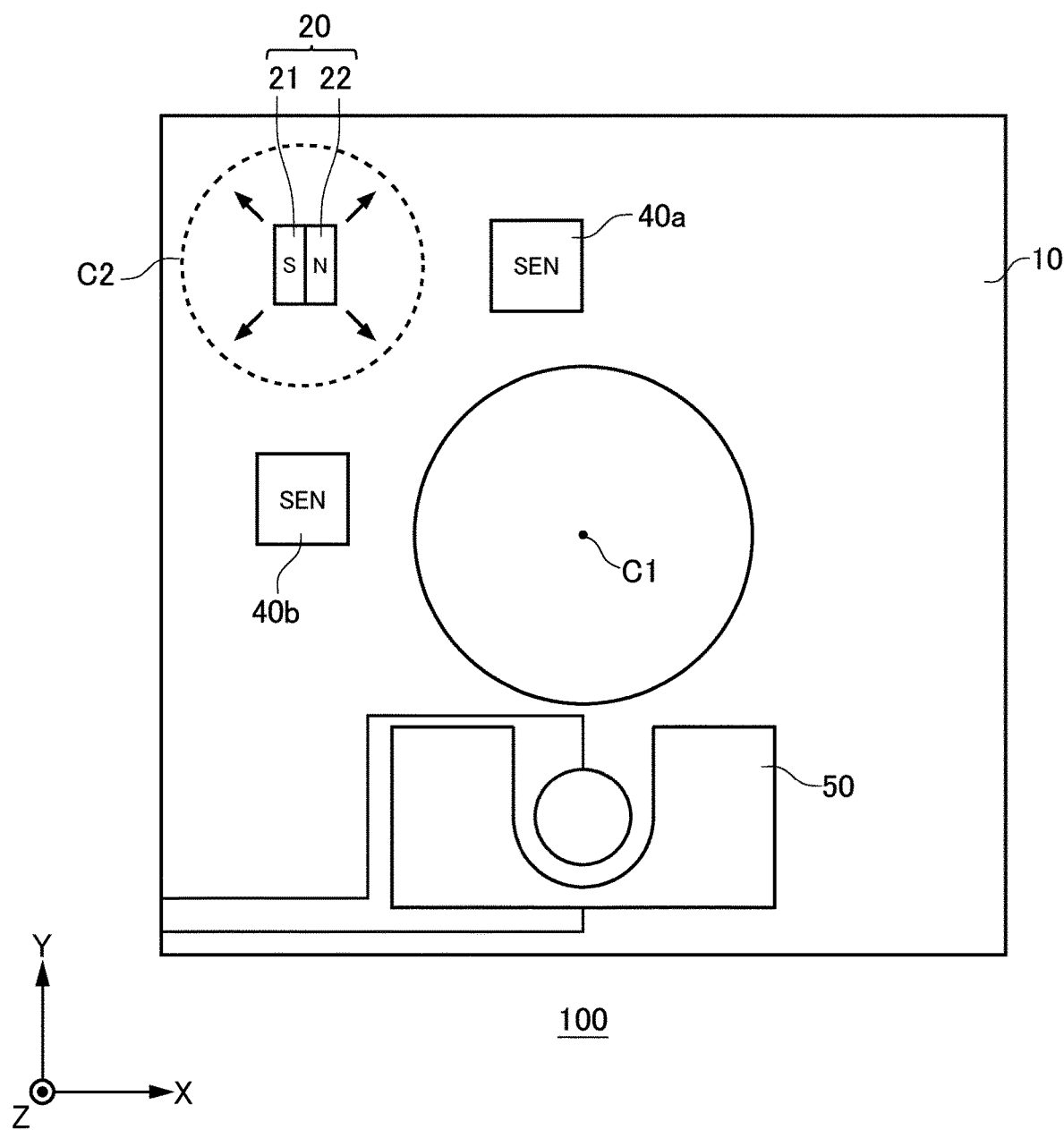
FIG. 5D shows a modification example of the input device 100.

FIG. 5D shows a modification example of the input device 100. The input device 100 of the present example includes the total two of the sensor 40a and the sensor 40b, and the one magnet 20. The input device 100 of the present example detects, by the total two of the sensor 40a and the sensor 40b, the movement of the one magnet 20 that moves in the XY plane.

The magnet 20 is arranged to move in the predetermined circle C2 in the top view. The magnet 20 of the present example moves on the outer periphery of and inside the circle C2 according to the tilting operation of the operation unit 15. The magnet 20 of the present example includes the first pole 21 and the second pole 22 arrayed in a predetermined direction in the XY plane.

The sensor 40a and the sensor 40b are arranged outside the circle C2 in which the magnet 20 moves in the top view. The sensor 40a of the present example is provided on the positive side in the X axis direction of the circle C2 in which the magnet 20 moves, and the sensor 40b is provided on the negative side in the Y axis direction of the circle C2 in which the magnet 20 moves. This makes it possible to detect the changes in the magnetic fields in two axes in accordance with the position of the magnet 20. The positions of the sensor 40a and the sensor 40b are not limited to the present example as long as the magnetic field of the magnet 20 is able to be detected at the positions.

In this way, the input device 100 can determine any number and any positions of the magnets 20 and the sensors 40, so that the layout has a high degree of freedom and it is easy to realize the reduction of the size. By reducing the number of sensors 40 that are mounted on the input device 100, it is possible to realize simple wiring and improve workability during mounting. In addition, by simplifying an internal structure of the input device 100, it is possible to reduce a mounting error.

Figure 6A:
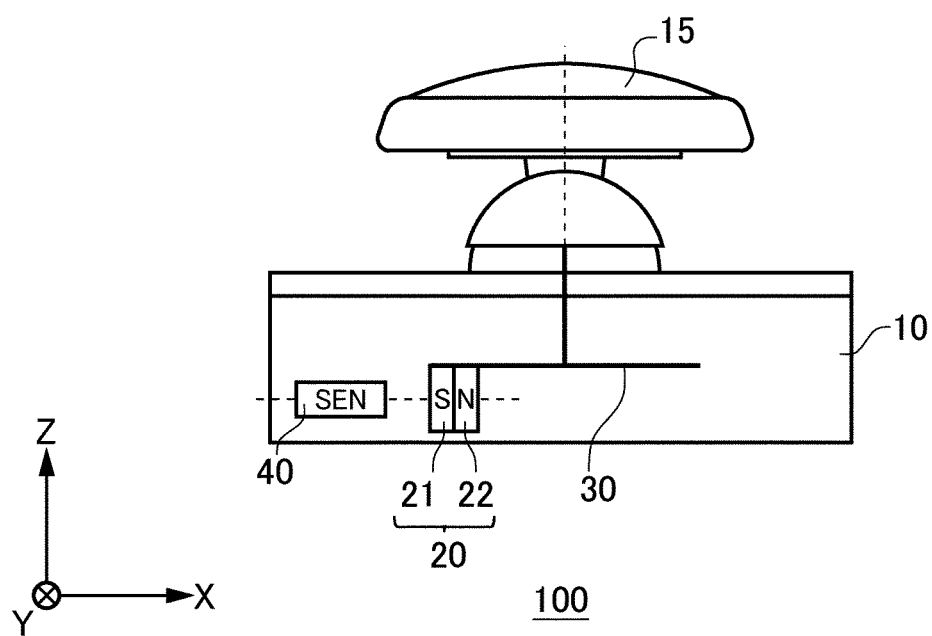
FIG. 6A is a cross sectional view showing a modification example of the input device 100.

FIG. 6A is a cross sectional view showing a modification example of the input device 100. In the present example, heights of the magnet 20 and the sensor 40 are adjusted to overlap each other.

The sensor 40 is arranged at the same height as that of the magnet 20 in the Z axis direction. The same height may refer to overlapping of at least parts of the magnet 20 and the sensor 40 in the Z axis direction. The heights of the magnet 20 and the sensor 40 of the present example are adjusted such that the centers in the Z axis direction coincide with each other. By aligning the heights of the magnet 20 and the sensor 40 in the Z axis direction, even when the magnet 20 moves, it is difficult for the magnetic field, which is input in the Z axis direction to the sensor 40, to be changed. This makes it possible for the input device 100 to improve precision in sensing the disturbance by detecting the magnetic field in the Z axis direction.

Figure 6B:
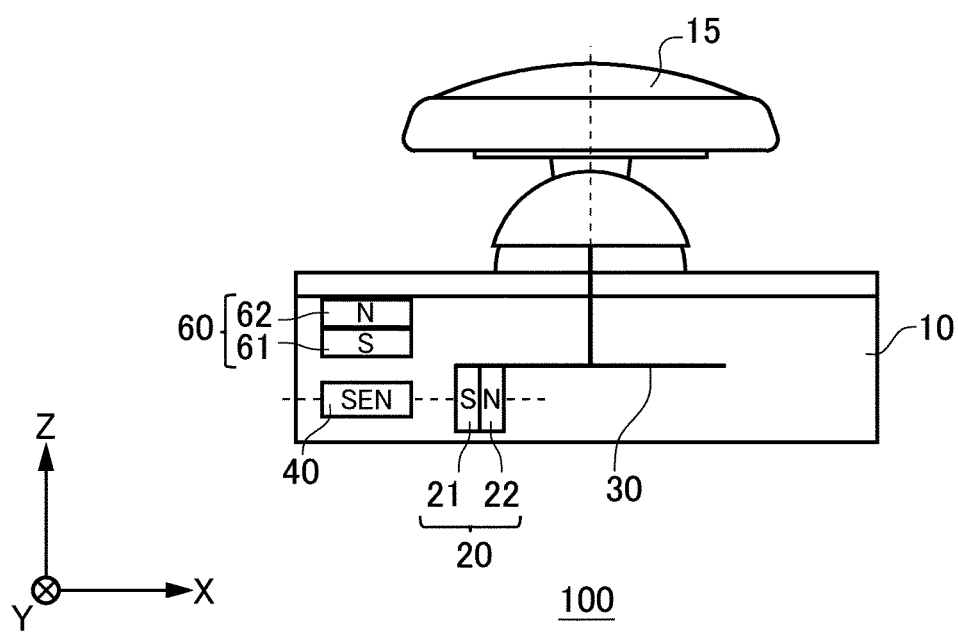
FIG. 6B is a cross sectional view showing a modification example of the input device 100.

FIG. 6B is a cross sectional view showing a modification example of the input device 100. In the present example, a magnetic field generation unit 60 is arranged above the sensor 40.

The magnetic field generation unit 60 has a first pole 61 and a second pole 62, and generates a magnetic field of predetermined magnitude. In the present example, the first pole 61 is a south pole and the second pole 62 is a north pole. The magnetic field generation unit 60 of the present example is fixed above the housing 10 and applies a magnetic field of a predetermined intensity to the sensor 40. The shape of the magnetic field generation unit 60 of the present example is a rectangular parallelepiped, but is not limited to this.

In the present example, the first pole 61 is arranged at a position close to the sensor 40, and the second pole 62 is arranged at a position away from the sensor 40; however, the first pole 61 and the second pole 62 may be arranged vice versa. That is, the magnetic field generation unit 60 only needs to be able to apply a magnetic field in the Z axis direction to the sensor 40, and a magnetization direction thereof is not limited.

Figure 6C:
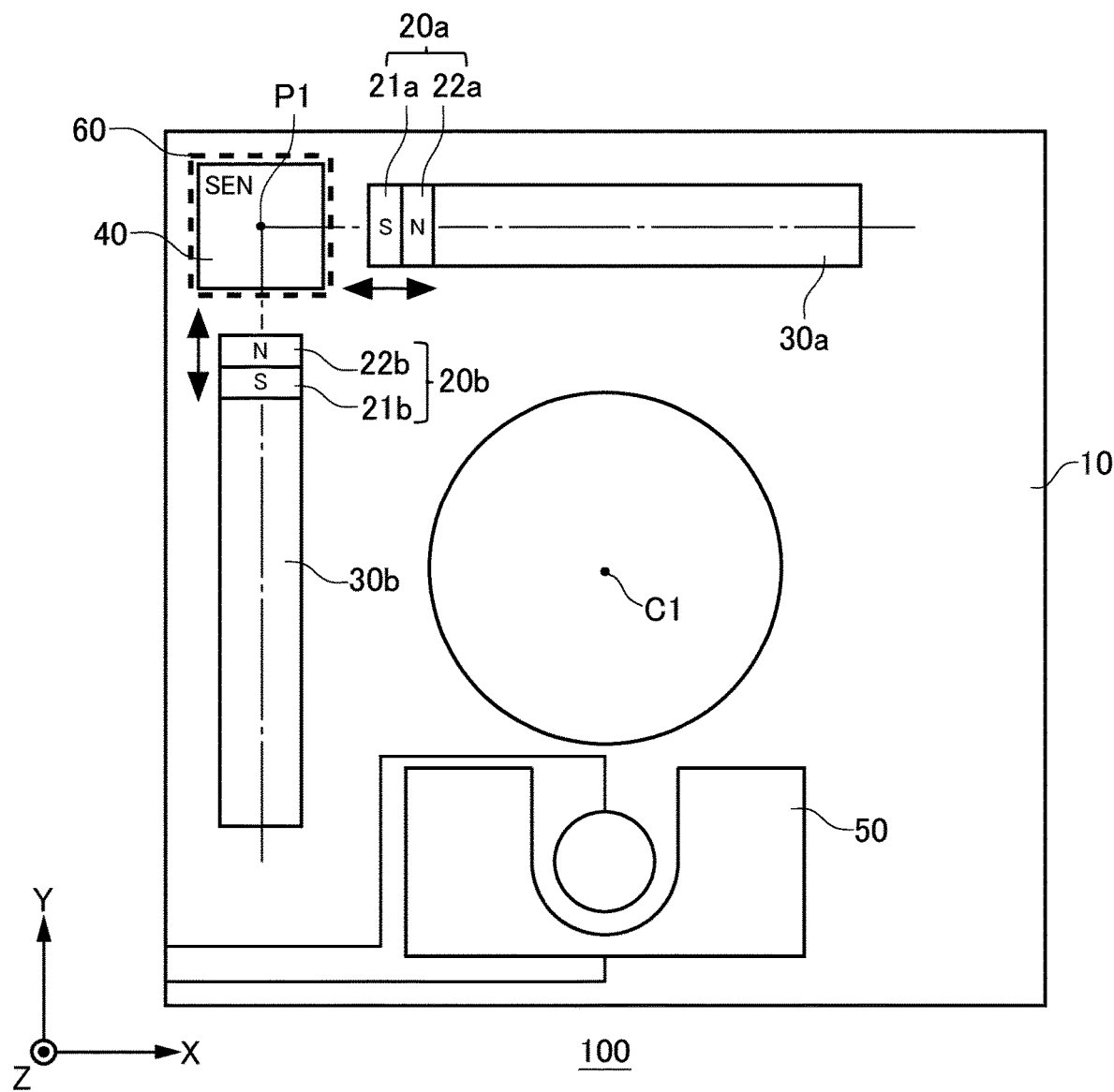
FIG. 6C is the top plan view showing a modification example of the input device 100.

FIG. 6C is the top plan view showing a modification example of the input device 100. In FIG. 6C, the magnetic field generation unit 60 is arranged directly above the sensor 40, but does not necessarily be arranged directly above. The position of the magnetic field generation unit 60 may be above the sensor 40, or may be a position partially overlapping the sensor 40 in the top view.

The position of the magnetic field generation unit 60 may be arranged to be shifted in the X, Y, and Z directions, for example, according to an arrangement position of another component of the input device 100, or according to the intensity of the magnetic field which is desired to be applied in the X and Y axis directions of the sensor 40, or according to the measurement range of the sensor 40. The magnetic field generation unit 60 is a fixed magnet, and thus does not require a magnet moving unit, and there is no limitation on the thickness. Therefore, an addition is possible in a range in which the reduction of the housing 10 in thickness is not affected.

By the way, it is known that when a temperature of the magnet changes, a residual magnetic flux density thereof changes. Accordingly, when the temperature inside the housing 10 changes, the magnitude of the magnetic field which is applied by the magnet 20 to the sensor 40 changes, which causes a problem that position coordinates of the operation unit 15 which is detected are shifted. In the input device 100 of the present example, by applying the magnetic field in the Z axis direction to the sensor 40 by using the magnetic field generation unit 60, it is possible to correct the magnetic field data when the temperature changes.

In the situations shown in FIG. 6B and FIG. 6C, when the magnetic field in the X axis direction and the magnetic field in the Z axis direction which are received by the sensor 40 are respectively set as $B_x$ and $B_z$, $B_x$ and $B_z$ can be represented by the following expression 1.

$$B_x = B_x(20) + B_x(60)$$

$$B_z = B_z(60)$$

Here, $B_x(20)$ and $B_x(60)$ are respectively the magnitudes of the magnetic fields in the X axis direction which are applied to the sensor 40 by the magnet 20 and the magnetic field generation unit 60, and $B_z(60)$ is the magnitude of the magnetic field in the Z axis direction which is applied to the sensor 40 by the magnetic field generation unit 60. In the situation shown in FIG. 6B, the magnet 20 and the sensor 40 are at the same height in the Z axis direction, so that the magnet 20 does not apply the magnetic field in the Z axis direction to sensor 40. The following expression 2 is obtained by taking a ratio of each axis.

$$\frac{B_x}{B_z} = \frac{B_x(20) + B_x(60)}{B_z(60)}$$

When the temperature changes by $\Delta T$, the magnitude of the magnetic field changes linearly with the temperature, so that expression 2 is transformed into the following expression 3. Here, $\alpha_{20}$ and $\beta_{20}$ are coefficients determined by magnet materials of the magnet 20, and $\alpha_{60}$ and $\beta_{60}$ are coefficients determined by a magnet material of the magnetic field generation unit 60.

$$\frac{B_x}{B_z} = \frac{(\alpha_{20}\Delta T + \beta_{20})B_x(20) + (\alpha_{60}\Delta T + \beta_{60})B_x(60)}{(\alpha_{60}\Delta T + \beta_{60})B_z(60)}$$

Here, when the materials of the magnet 20 and the magnetic field generation unit 60 are the same as each other, $\alpha_{20}=\alpha_{60}$ and $\beta_{20}=\beta_{60}$, and expression 3 can be transformed into the following expression 4. Expression 4 does not include $\Delta T$, and thus it can be seen that by applying the magnetic field in the Z axis direction by using the magnetic field generation unit 60, it is possible to prevent the position coordinates from being shifted due to a temperature characteristic of the magnet 20.

$$\frac{B_x}{B_z} = \frac{B_x(20) + B_x(60)}{B_z(60)}$$

In the present example, the magnets made of the same material are used for the magnet 20 and the magnetic field generation unit 60, but the materials may not be the same as long as $\alpha_{20}=\alpha_{60}$ and $\beta_{20}=\beta_{60}$. That is, the magnet 20 and the magnetic field generation unit 60 only need to have the same temperature characteristic.

Based on the magnetic field which is applied to the sensor 40 by the magnetic field generation unit 60 having the same temperature characteristic, the magnetic field data which is output by the sensor 40 can be corrected by the calculation described above. This makes it possible to prevent the position coordinates of the operation unit 15 which is detected, from being shifted due to the temperature characteristic of the magnet 20.

The case where the heights of the magnet 20 and the sensor 40 coincide with each other in the Z axis direction has been described, so far; however, the magnet 20 may have a height different from that of the sensor 40 in the Z axis direction.

When the magnet 20 and the sensor 40 are at different heights in the Z axis direction, the magnitude of the magnetic field which is applied to the sensor 40 by the magnetic field generation unit 60 may be greater than the magnitude of the magnetic field which is applied to the sensor 40 by the magnet 20. That is, when the magnitude of the magnetic field which is applied to the sensor 40 by the magnet 20 in the Z axis direction is set as $B_z(20)$, $B_z(60)$ may be greater than $B_z(20)$.

In addition, a distance between the magnetic field generation unit 60 and the sensor 40 may be smaller than a distance when the magnet 20 and the sensor 40 are closest to each other. This makes it possible for the magnitude of the magnetic field which is applied to the sensor 40 by the magnetic field generation unit 60, to be greater than the magnitude of the magnetic field which is applied to the sensor 40 by the magnet 20. More specifically, as will be described below, in an example, a minimum value of the distance from the intersection point P1 to the magnet 20 is 2.5 mm, and thus by the distance from an upper surface of the sensor 40 to a bottom surface of the magnetic field generation unit 60, being less than 2.5 mm, $B_z(60)$ can be made to be greater than $B_z(20)$.

When the centers of the magnet 20 and the sensor 40 in the Z axis direction do not coincide with each other, the magnet 20 gives the magnetic field in the Z axis direction to the sensor 40, so that expression 2 described above becomes the following expression 5.

$$\frac{B_x}{B_z} = \frac{B_x(20) + B_x(60)}{B_z(20) + B_z(60)}$$

In expression 2, a variable on a right side is only $B_x(20)$, whereas in expression 5, a variable $B_z(20)$ is added to complicate the calculation. Therefore, for example, by adjusting the arrangement of the magnetic field generation unit 60 and the magnet 20 or the like for $B_z(60)$ to be greater than $B_z(20)$, expression 5 described above can be approximated as the following expression 6, and as a result, can be treated as expression 4 described above.

$$\frac{B_x}{B_z} = \frac{B_x(20) + B_x(60)}{B_z(60)\left(1 + \frac{B_z(20)}{B_z(60)}\right)} \cong \frac{B_x(20) + B_x(60)}{B_z(60)}$$

Figure 6D:
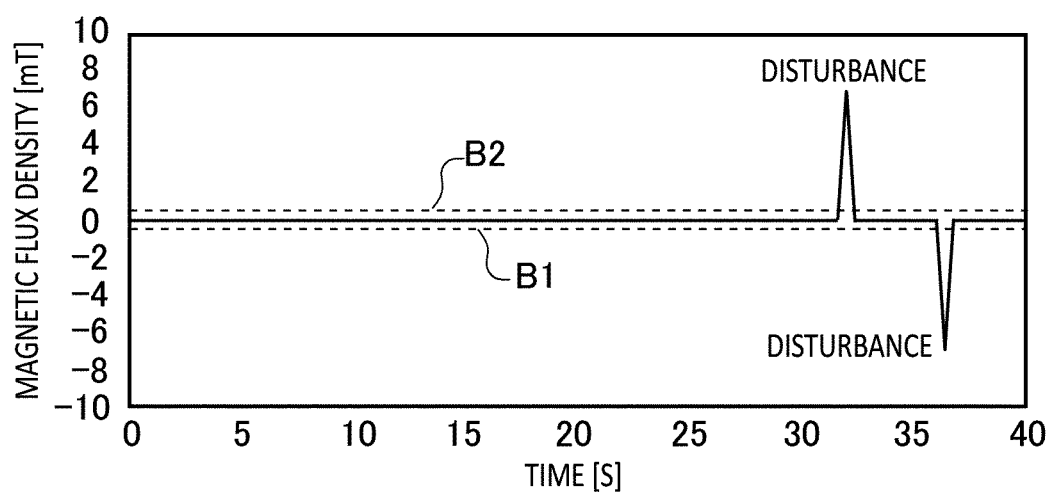
FIG. 6D shows an example of a disturbance sensing method by the input device 100.

FIG. 6D shows an example of a disturbance sensing method by the input device 100. The input device 100 of the present example sets a threshold value B1 and a threshold value B2 predetermined for the magnetic flux density (mT), and when the detected magnetic field in the Z axis direction exceeds a range from the threshold value B1 to the threshold value B2, it is determined that the disturbance is sensed. By aligning the heights of the magnet 20 and the sensor 40, the input device 100 can easily suppress the influence of the movement of the magnet 20 on the magnetic flux density in the Z axis direction. This makes it possible to improve the precision in sensing the disturbance.

The threshold value B1 may be a value obtained by subtracting a value of the magnetic field corresponding to geomagnetism, from a minimum value of the magnetic field which is applied to the sensor 40 when the operation unit 15 is operated in a predetermined pattern. The threshold value B2 may be a value obtained by adding a value of the magnetic field corresponding to geomagnetism, to a maximum value of the magnetic field which is applied to the sensor 40 when the operation unit 15 is operated in a predetermined pattern. The value which is subtracted from the maximum value and the minimum value may also be a value with a margin more than the magnetic flux density by the geomagnetism. This makes it possible to suppress the influence of the magnetic field which is generated by a metal part (for example, a spring) magnetized by the magnet 20. In addition, it is possible to suppress the influence of the magnetic field which is generated by the movement of the magnet 20 due to the mounting error. For example, the threshold value B1 and the threshold value B2 are respectively −500 µT and +500 µT.

Figure 6E:
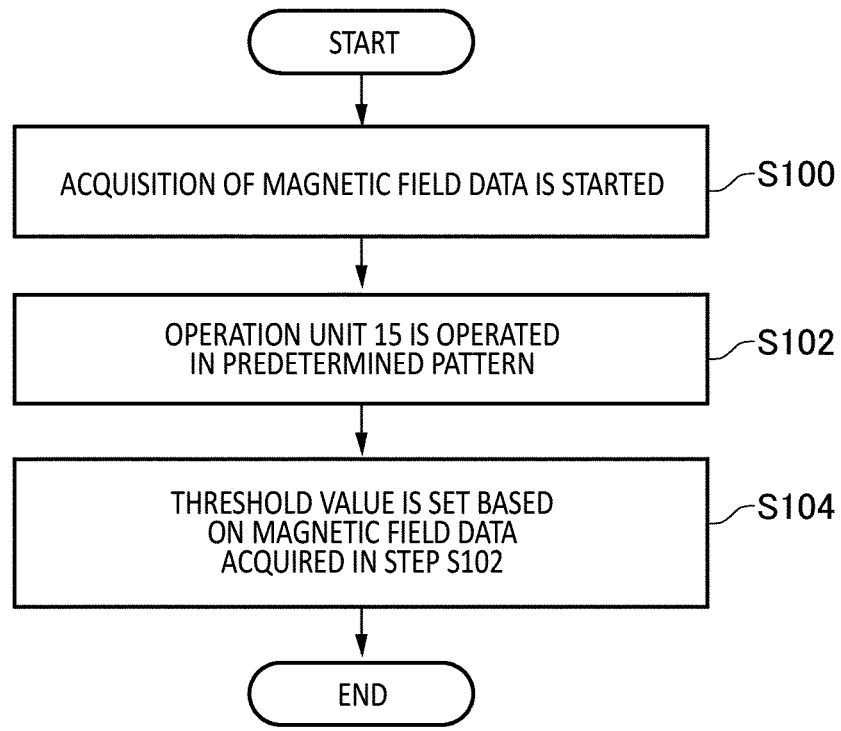
FIG. 6E shows an example of a flowchart of a threshold value setting method.

FIG. 6E shows an example of a flowchart of a threshold value setting method. The flowchart of the present example is an example of a process for setting a threshold value for sensing the disturbance in a normal processing state. In step S100, an acquisition of the magnetic field data is started. The acquisition of the magnetic field data may be performed by a processing unit provided inside the input device 100, or may be performed by a processing unit provided outside the input device 100.

In step S102, the operation unit 15 is operated in a predetermined pattern. For example, the operation is performed to go around an outer periphery of the operation unit 15. In addition, an instruction which is "tilt a stick forward and slowly rotate it clockwise for 5 seconds" may be displayed for a user to operate the operation unit 15 in the predetermined pattern.

In step S104, a threshold value is set based on the magnetic field data acquired in step S102. In step S104, a maximum value and a minimum value may be extracted from the magnetic field data acquired in step S102. In an example, the threshold value is set based on the maximum value and the minimum value of the magnetic field data acquired in step S102, and the geomagnetism. For example, a value obtained by subtracting the value of the magnetic field corresponding to the geomagnetism from the minimum value of the magnetic field data acquired in step S102, is set as the threshold value B1, and a value obtained by adding the value of the magnetic field corresponding to the geomagnetism to the maximum value, is set as the threshold value B2. This makes it possible to avoid an erroneous sensing of the disturbance due to the movement of the magnet 20 during a normal operation. It should be noted that the threshold value setting method for the present example may be executed when the input device 100 is manufactured, may be executed after the input device 100 is mounted on the controller, or may be executed by the user who uses the input device 100. For example, the user may reset the threshold value after the threshold value is set when the input device 100 is shipped from a factory.

Figure 6F:
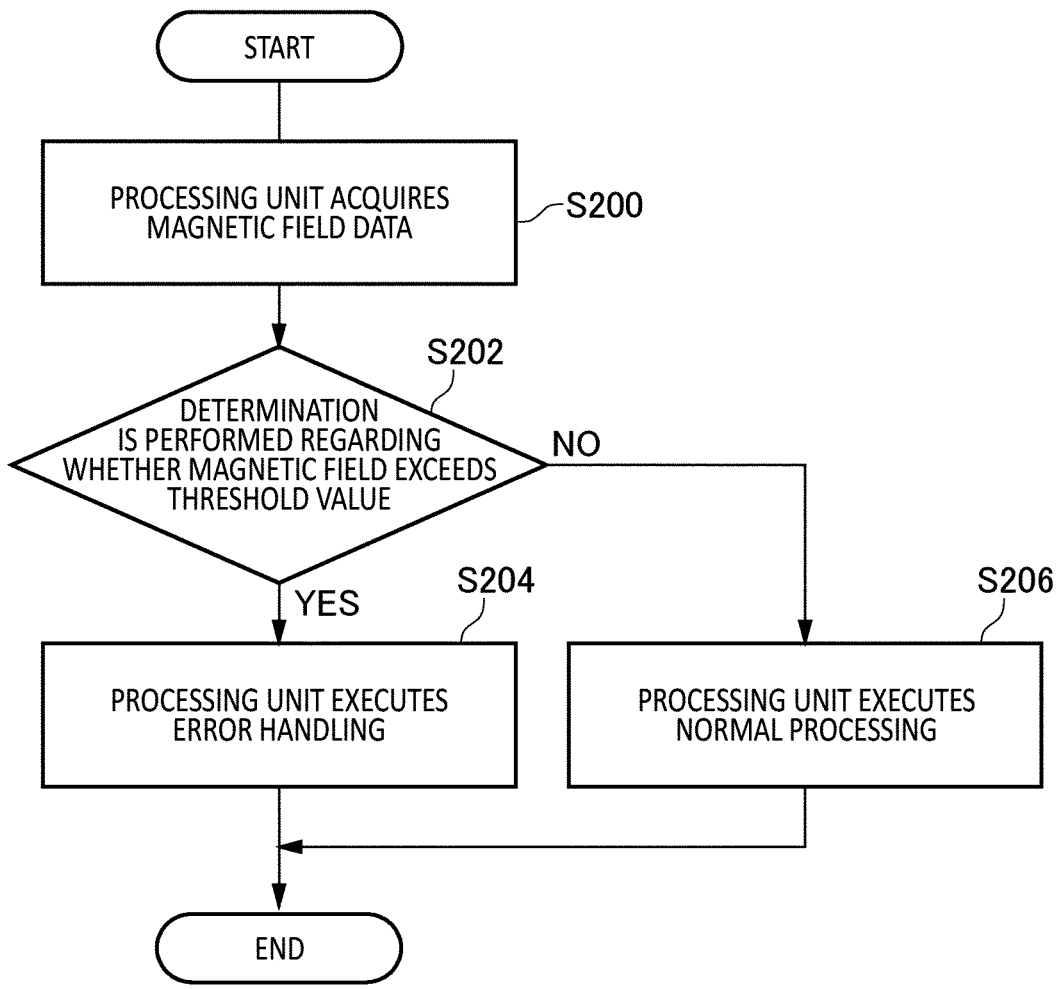
FIG. 6F shows an example of an operation flowchart for processing magnetic field data.

FIG. 6F shows an example of an operation flowchart for processing magnetic field data. In step S200, the processing unit acquires the magnetic field data. In step S200, the magnetic field data in the normal processing state may be obtained. For example, when the input device 100 is a game controller, the normal processing state refers to a state in which a game is played by using the input device 100. In step S202, a determination is performed regarding whether the magnetic field exceeds the threshold value. In step S202, the threshold value set in step S104 may be used. If the magnetic field exceeds the threshold value, error handling is executed in step S204, and if the magnetic field does not exceed the threshold value, the normal processing continues in step S206. The error handling may be processing in which the magnetic field data exceeding the threshold value is not adopted, or may be processing in which the user is provided with a notification that the disturbance is sensed. In this way, by sensing the disturbance by the sensor 40 by using the three-axis magnetic sensor, it is possible to realize the error handling for the disturbance.

Figure 7A:
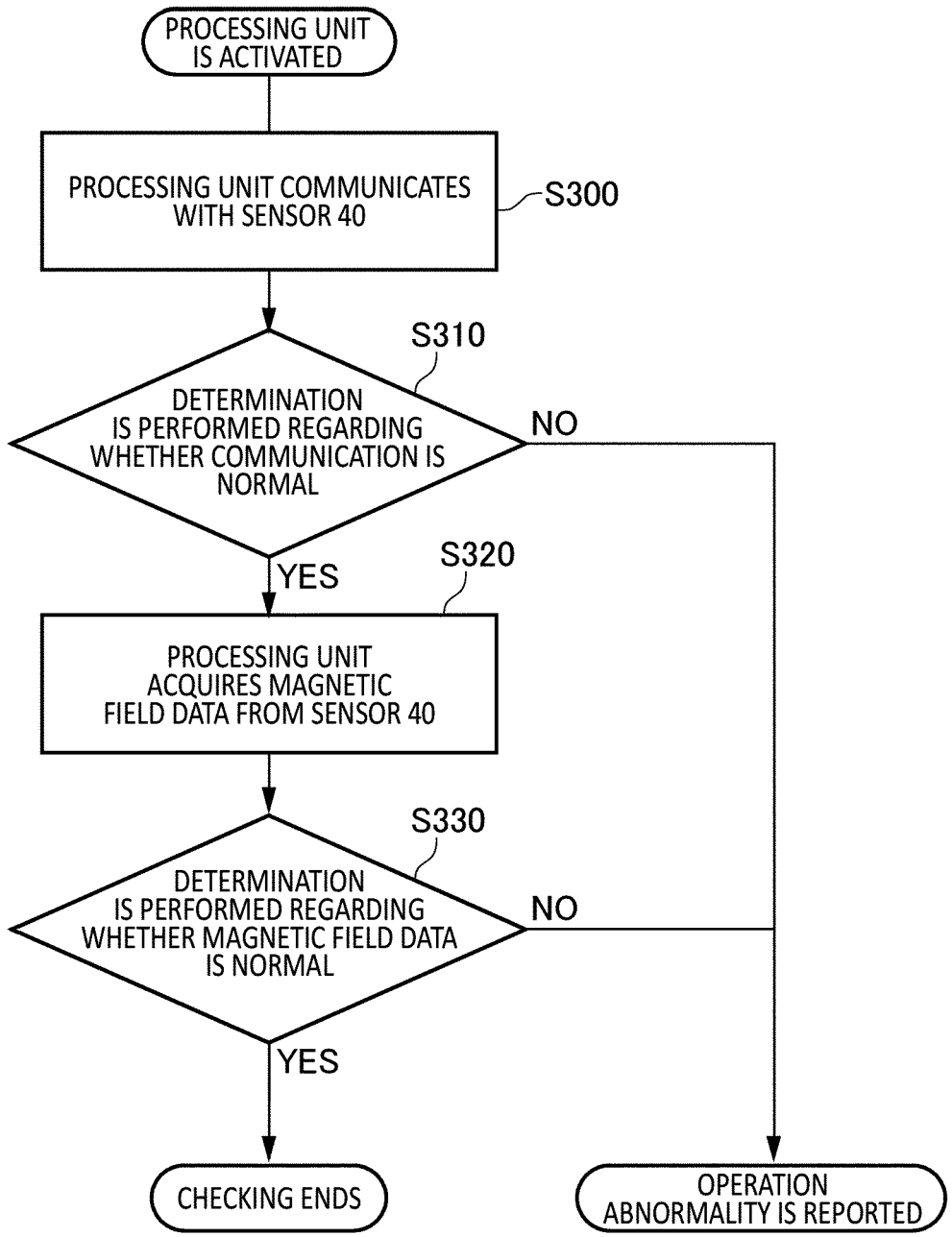
FIG. 7A is an operation flowchart of a system for checking a normal operation of the sensor 40.

FIG. 7A is an operation flowchart of a system for checking a normal operation of the sensor 40. in step S300, the processing unit starts a communication with the sensor 40. In step S310, a determination is performed regarding whether the communication between the processing unit and the sensor 40 is normal. If the communication is normal, the processing unit acquires the magnetic field data from the sensor 40 in step S320. If the communication is not normal, an operation abnormality is reported. A specific determination method for the magnetic field data in step S320 will be described below.

In step S330, a determination is performed regarding whether the magnetic field data is normal, and if the magnetic field data is normal, checking ends, and if the magnetic field data is not normal, the operation abnormality is reported. This makes it possible for the input device 100 to check that the magnet 20 and the sensor 40 are correctly arranged and that the sensor 40 is normally operating.

It should be noted that the determination regarding whether the communication is normal in step S310, may be executed by an authentication operation between the processing unit and the input device 100. For example, the processing unit designates the sensor 40 with a slave address and determines a read value of a specific register (a device ID). After determining the read value of the device ID, the processing unit may execute a self-diagnostic function (that is, a self-test) to determine whether the communication is normal based on a result thereof.

Figure 7B:
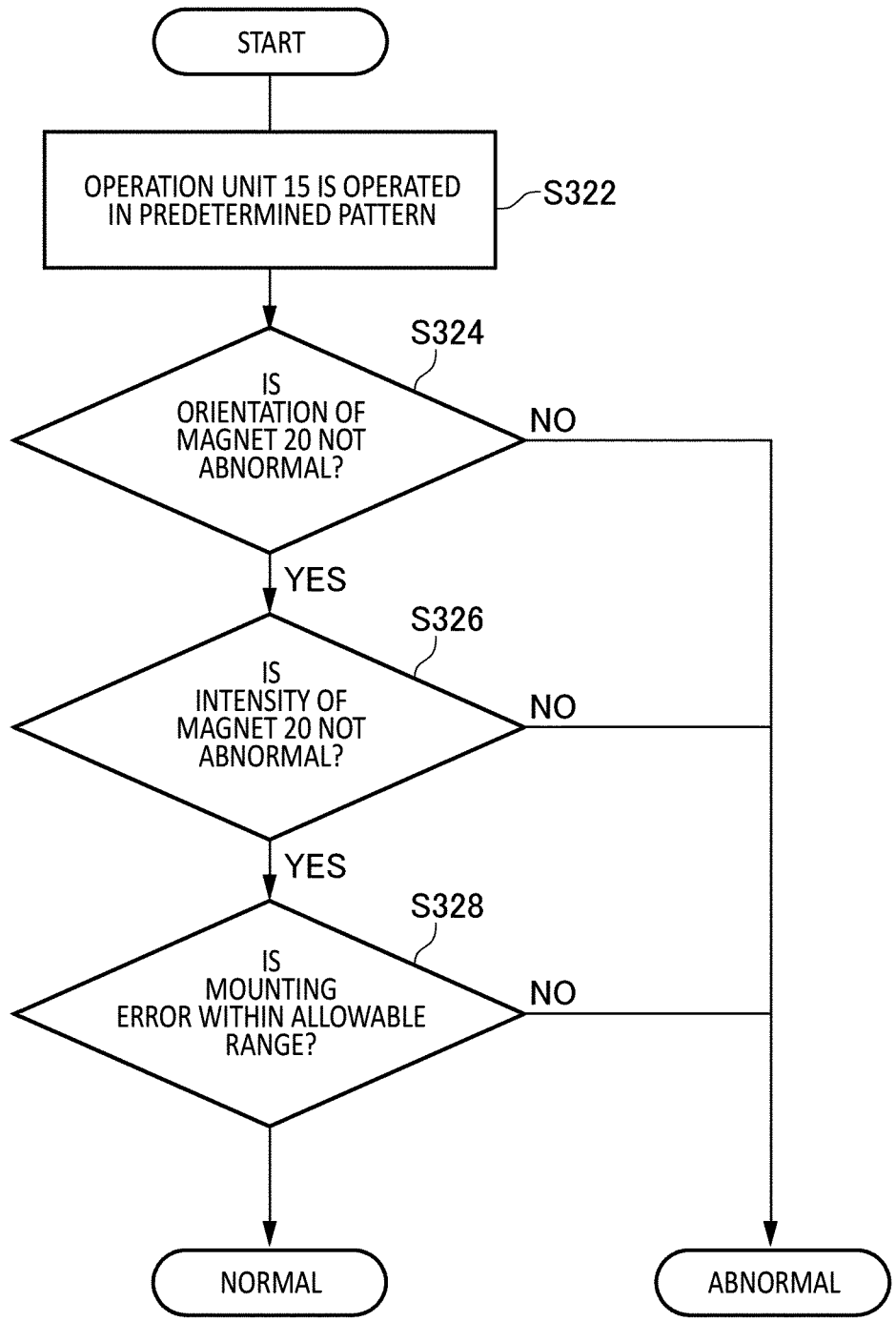
FIG. 7B shows an example of an operation flowchart for acquiring the magnetic field data.

FIG. 7B shows an example of an operation flowchart for acquiring the magnetic field data. The operation flowchart of the present example shows a specific method for determining whether the magnetic field data is normal in step S320.

In step S322, the operation unit 15 is operated in a predetermined pattern. The processing unit may instruct the user to perform the operation according to the predetermined pattern. In step S324, a determination is performed regarding whether an orientation of the magnet 20 is not abnormal.

If the orientation of the magnet 20 is abnormal, the magnetic field data is determined to be abnormal, and if the orientation of the magnet 20 is not abnormal, a determination is performed regarding whether an intensity of the magnet 20 is not abnormal in step 326. If the intensity of the magnet 20 is abnormal, the magnetic field data is determined to be abnormal, and if the intensity of the magnet 20 is not abnormal, a determination is performed regarding whether the mounting error of the input device 100 is within an allowable range in step S328. The magnetic field data is determined to be abnormal if the mounting error is not within the allowable range, and is determined to be normal if the mounting error is within the allowable range. In step S324 to step S328, each step is determined by using at least one of the magnitude of the magnetic field output, the polarity of the magnetic field output, or a distortion of the magnetic field output which are obtained by the operation in step S322. It should be noted that order in which step S324 to step S328 are executed may be changed appropriately. After step S322, at least one of step S324 to step S328 may be executed.

Figure 8:
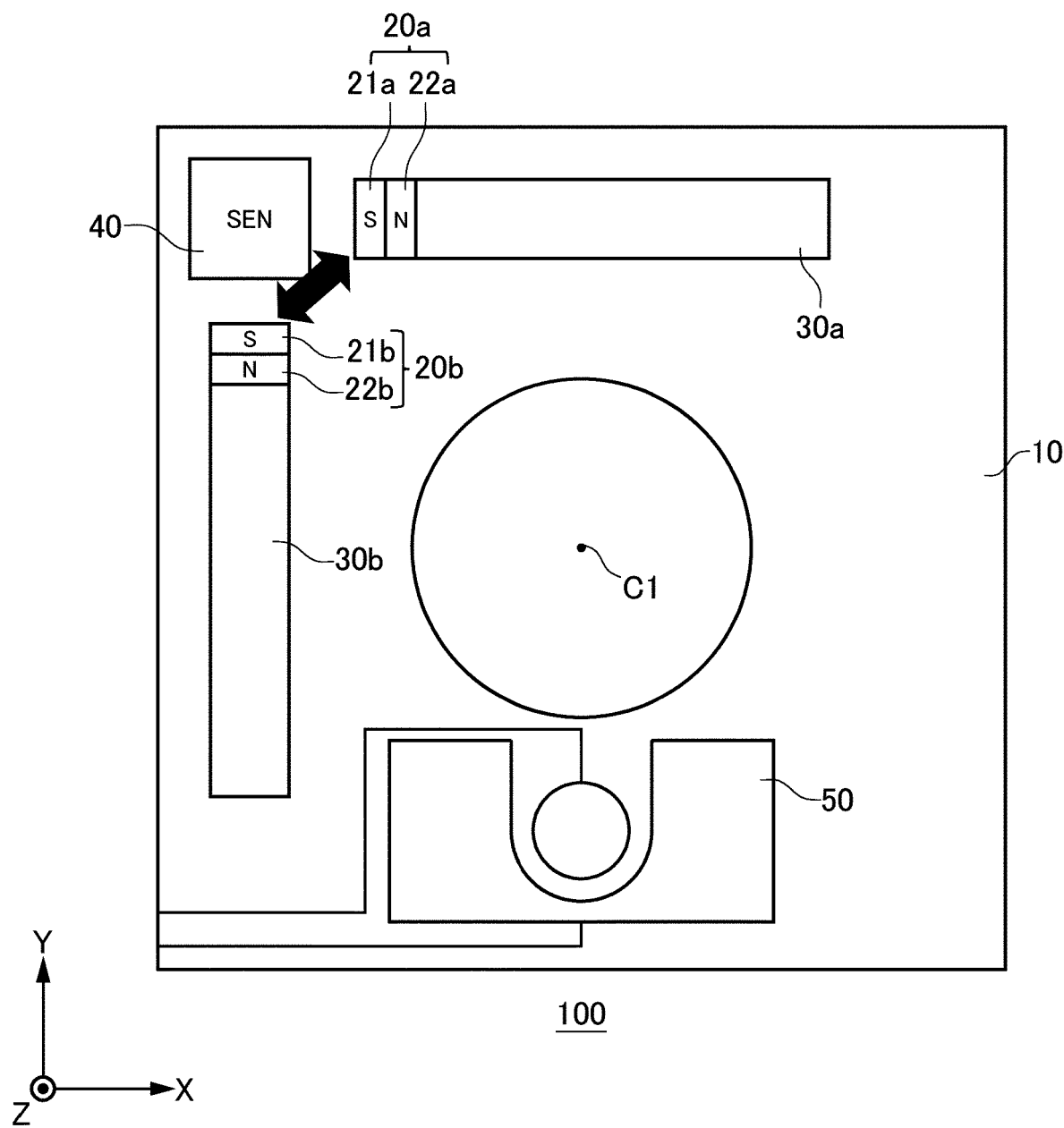
FIG. 8 is an example of the input device 100 when magnets are arranged in a repulsion arrangement.

FIG. 8 is an example of the input device 100 when magnets 20 are arranged in a repulsion arrangement. The input device 100 of the present example has the same basic configuration as that of the example embodiment of FIG. 3A.

In the input device 100, polarities are arranged to repel each other when the magnet 20a and magnet 20b approach the sensor 40. In this way, in the case of the repulsion arrangement in which the magnet 20a and the magnet 20b repel each other, the repulsive force between the two magnets acts in a direction in which the operation unit 15 returns to the reference position. In the direction in which the operation unit 15 returns to the reference position, resilience to the reference position by the spring is added, so that it is difficult for the user to feel the repulsive force between the magnets 20.

On the other hand, in the case of the attraction arrangement in which the magnets 20 attract each other, the attractive force acts in a direction in which the resilience to the reference position by the spring is canceled, so that the user may have an impression that the return of the operation unit 15 is poor only when the operation unit 15 is tilted in a specific direction. Therefore, by arranging the magnets 20 to repel each other, the operational feeling of the input device 100 is easily improved.

In addition, in the case of the attraction arrangement, the magnets 20 need to be attached in opposite orientations with respect to the magnet moving unit 30, respectively, whereas in the case of the repulsion arrangement, the magnets 20 only need to be attached in the same orientation with respect to the magnet moving unit 30. Therefore, in the repulsion arrangement, the same member can be used commonly in the magnet moving unit 30a and the magnet moving unit 30b, so that mass productivity can be improved.

Figure 9A:
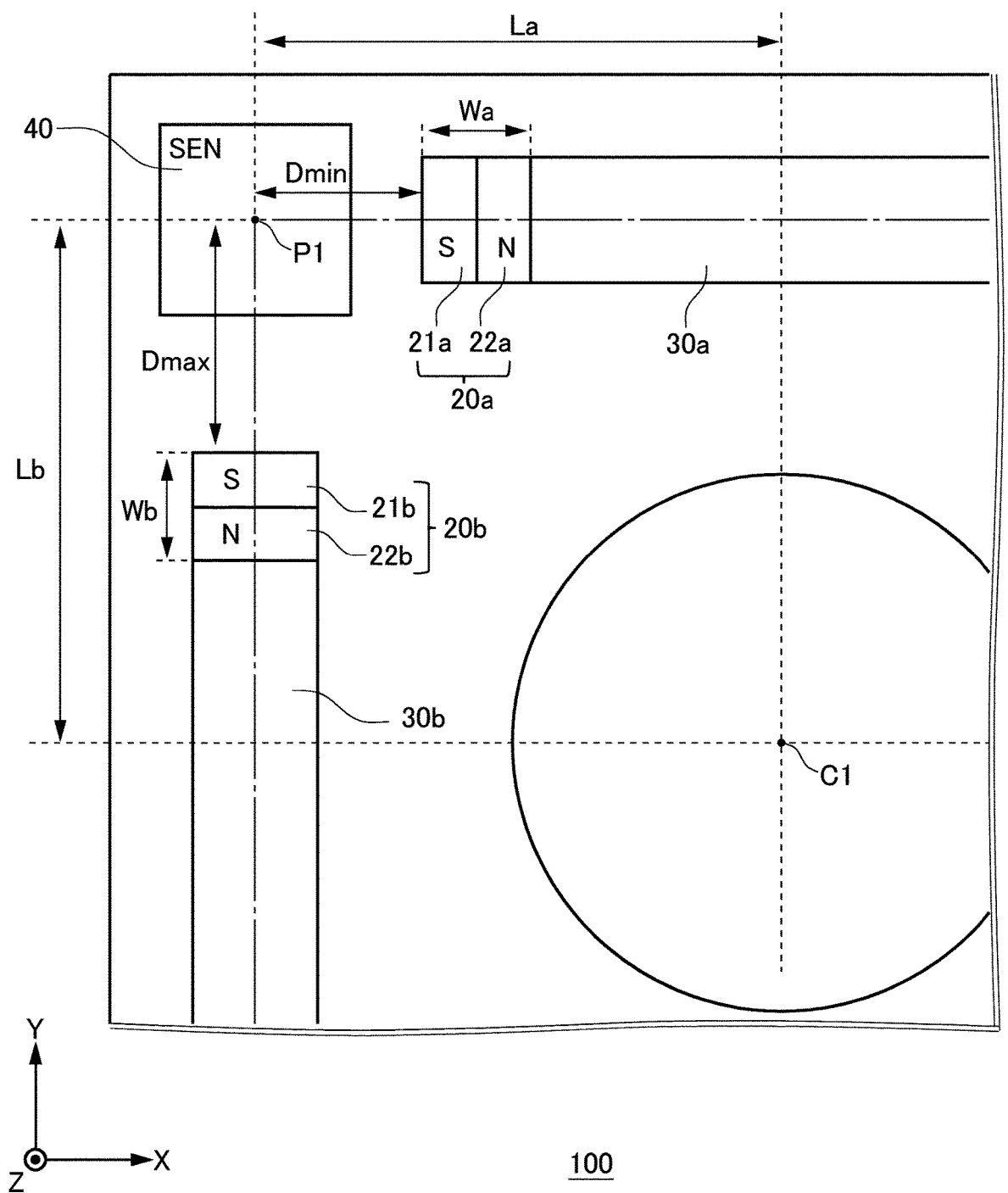
FIG. 9A shows an example of an enlarged view near the sensor 40.

FIG. 9A shows an example of an enlarged view near the sensor 40. In the present example, an example of a designing method for the layout of the input device 100 is shown.

A distance L is a distance between the intersection point P1 and the center C1 in the X axis direction or the Y axis direction. In particular, a distance La indicates a distance between the intersection point P1 and the center C1 in the X axis direction. A distance Lb indicates a distance between the intersection point P1 and the center C1 in the Y axis direction. The magnet moving unit 30 may move the magnet 20 within a range of the distance L. In an example, the distance L is 5 mm or more and 8 mm or less. The distance La of the present example is the same as the distance Lb, but may be different from the distance Lb.

A width W is a width of the magnet 20 in the direction in which the magnet 20 moves. That is, the width W corresponds to one side of the magnet 20. In particular, a width Wa indicates a width of the magnet 20a in the X axis direction. A width Wb indicates a width of the magnet 20b in the Y axis direction. The magnet 20 may have a side with a length of 10% or more and 50% or less of the distance L. In an example, the magnet 20 has a side of 1 mm or more and 5 mm or less. The width W of the present example is 2 mm. The width Wa of the present example is the same as the width Wb, but may be different from the width Wb. A volume of the magnet 20 is, for example, 8 mm$^3$.

A distance D indicates a distance between the intersection point P1 and the magnet 20. The distance D changes according to the position of the magnet 20. A distance Dmin is a minimum distance of the distance D, and a distance Dmax is a maximum distance of the distance D. In an example, the distance Dmin is 2.5 mm and the distance Dmax is 4.5 mm.

Here, a minimum length by which a movement of a human can be sensed is approximately 0.1 mm. In order for the input device 100 to sense 0.1 mm, a stroke S1 of approximately 6 mm of the operation unit 15 needs to be divided into approximately 60 cells. That is, it is necessary to divide the stroke S1 of the magnet 20 that is in conjunction with the operation unit 15, into about approximately 60 cells. The stroke S1 will be described below. On the other hand, the magnitude of the geomagnetism is from 30 μT to 60 μT, and it is necessary to minimize its influence during the normal operation. For example, when the stroke of the magnet 20 is divided into a predetermined number of cells, an amount of the change in the magnetic field for each of all the cells needs to be 60 μT or more. In the input device 100 of the present example, the distance D is set to 2.5 mm or more and 4.5 mm or less for satisfying such a condition. This makes it possible to suppress the influence of the geomagnetism in use.

Figure 9B:
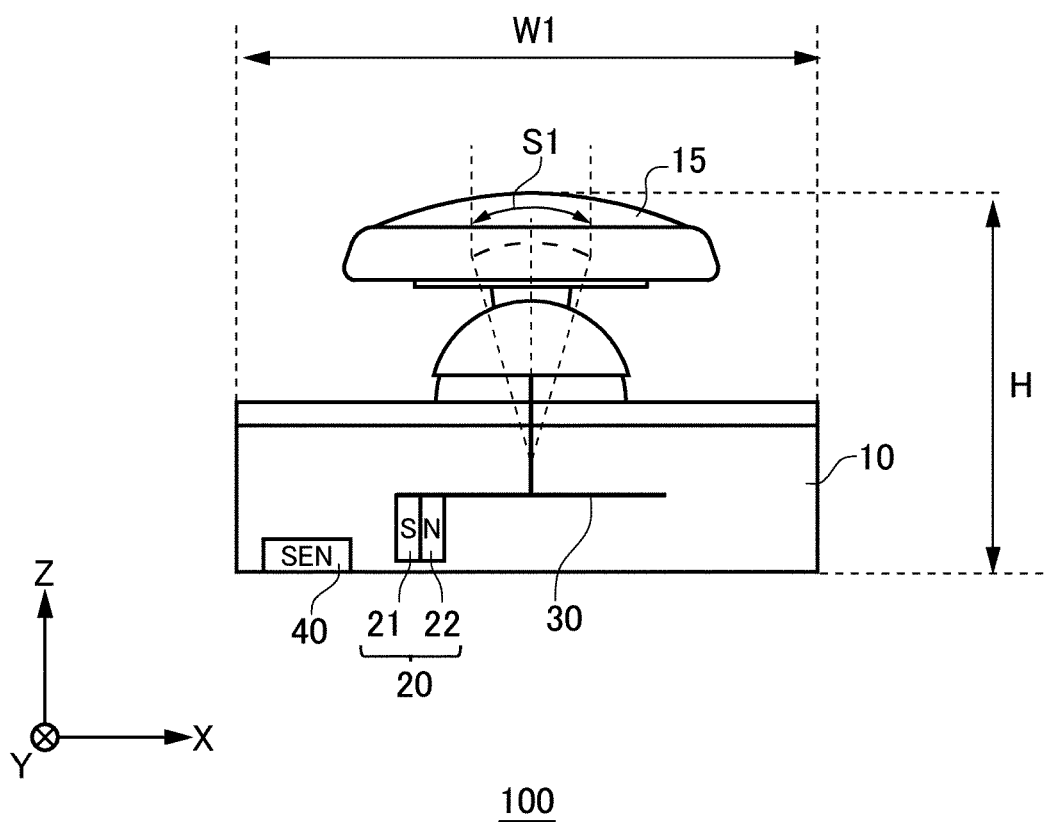
FIG. 9B shows a cross sectional view of the input device 100.

FIG. 9B shows a cross sectional view of the input device 100. A width W1 indicates a width of the housing 10 in the X axis direction. The width W1 is, for example, 15 mm or more and 25 mm or less. A height H indicates a height of the input device 100 from the bottom surface of the housing 10 to an upper surface of the operation unit 15. The height H is, for example, 12 mm or more and 16 mm or less. The stroke S1 is a maximum distance by which the operation unit 15 moves by the tilting of the operation unit 15. The stroke S1 in the present example is a trajectory distance of an apex of the operation unit 15 when the operation unit 15 moves from a position in a case of being most tilted to the positive side in the X axis direction, to a position in a case of being most tilted to the negative side in the X axis direction. The operation unit 15 may have the same stroke S1 in any direction in the XY plane.

Figure 10:
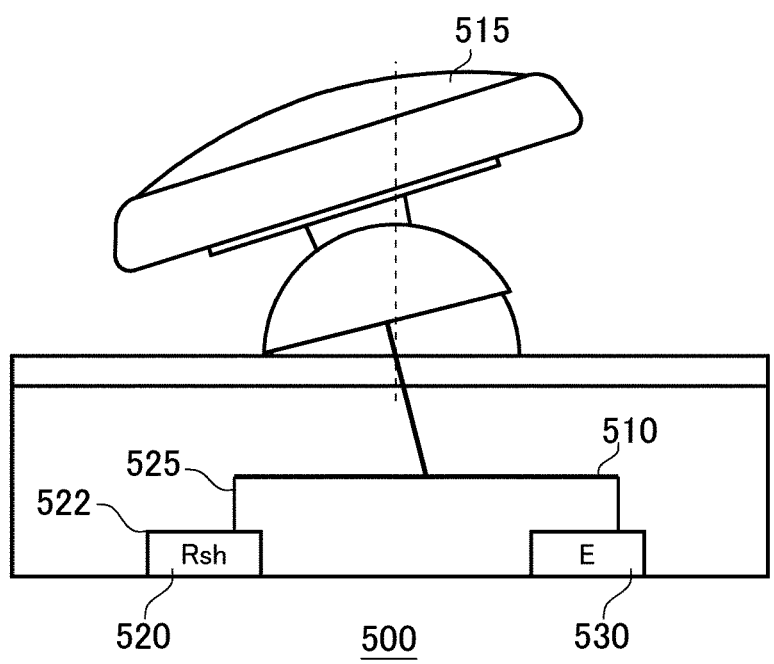
FIG. 10 shows an example of an input device 500 according to a comparison example.

FIG. 10 shows an example of an input device 500 according to a comparison example. An input device 500 slides a drive unit 510 connected to an operation unit 515 to move a contact unit 525 of a metal electrode in contact with a sheet resistance unit 520. The sheet resistance unit 520 is arranged at one end of the drive unit 510, and an electrode 530 is arranged at the other end. Accordingly, the input device 500 outputs an output voltage in accordance with the tilting of the operation unit 515.

However, in the input device 500, by a contact between the sheet resistance unit 520 and the contact unit 525, a surface 522 of the sheet resistance unit 520 may wear for an output of the input device 500 to be unstable. When the output of the input device 500 is unstable, the controller on which the input device 500 is mounted may malfunction.

Figure 11:
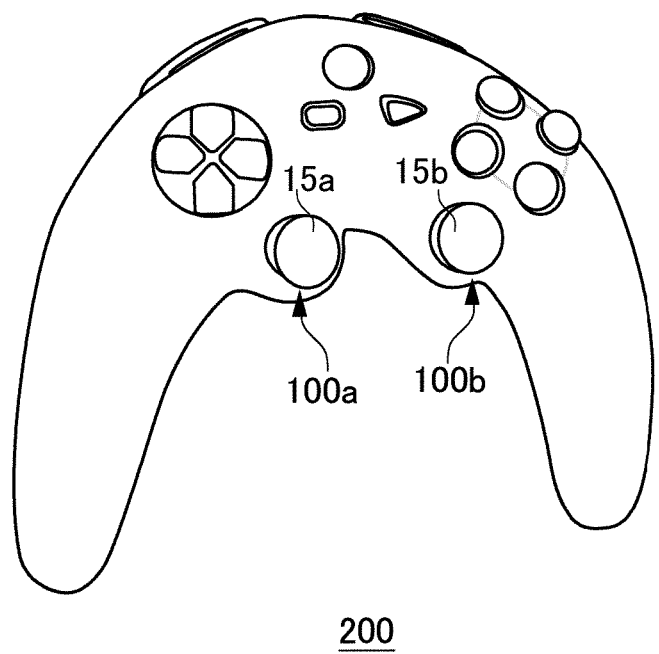
FIG. 11 shows an example of a configuration of a controller 200.

FIG. 11 shows an example of a configuration of a controller 200. The controller 200 of the present example includes total two of an input device 100a and an input device 100b. However, the number of input devices 100 is not limited to this. For example, the user can play the video game by operating each of an operation unit 15a and an operation unit 15b with a thumb.

While the present invention has been described by way of the embodiments, the technical scope of the present invention is not limited to the above described embodiments. It is apparent to persons skilled in the art that various alterations or improvements can be made to the above described embodiments. It is also apparent from the description of the claims that embodiments added with such alterations or improvements can be included in the technical scope of the present invention.

The operations, procedures, steps, and stages of each process performed by a device, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES

10: housing, 15: operation unit, 20: magnet, 21: first pole, 22: second pole, 30: magnet moving unit, 40: sensor, 50: sensing unit, 60: magnetic field generation unit, 61: first pole, 62: second pole, 100: input device, 200: controller, 500: input device, 510: drive unit, 515: operation unit, 520: sheet resistance unit, 522: surface, 525: contact unit, 530: electrode.

What is claimed is:

1. An input device comprising:
a magnet that generates a magnetic field;
a sensor for detecting the magnetic field generated by the magnet; and
a magnet moving unit for moving a position of the magnet in a predetermined first plane, wherein
the magnet includes a first magnet and a second magnet,
the sensor is provided in a region different from a region in which the magnet moves in a top view with respect to the first plane,
the magnet moving unit is configured to move the first magnet in a predetermined first direction in the first plane, and move the second magnet in a second direction different from the first direction in the first plane,
the first direction and the second direction intersect in the first plane, and
the sensor is provided in common to the first magnet and the second magnet.

2. The input device according to claim 1, wherein the sensor is provided at an intersection of the first direction and the second direction in the top view.

3. The input device according to claim 2, wherein a polarity of the first magnet arranged on a side of the sensor is a same as a polarity of the second magnet arranged on a side of the sensor.

4. The input device according to claim 1, wherein the sensor includes a first sensor for detecting a magnetic field of the first magnet, and
a second sensor for detecting a magnetic field of the second magnet.

5. The input device according to claim 1, wherein the magnet includes a first pole and a second pole, and the first pole and the second pole are arrayed in a predetermined direction in the first plane.

6. The input device according to claim 1, comprising:
an operation unit for operating the magnet by the magnet moving unit, wherein
the magnet moving unit moves the magnet in conjunction with an operation by the operation unit.

7. The input device according to claim 6, wherein the sensor is provided at a position shifted with respect to a center of the operation unit in the top view.

8. The input device according to claim 1, wherein the magnet moving unit moves the magnet within a range of a distance L between an intersection of the first direction in which the first magnet moves and the second direction in which the second magnet moves, and a center of an operation unit in the top view.

9. The input device according to claim 8, wherein a width of the magnet in the direction in which the magnet moves has a length of 10% or more and 50% or less of the distance L.

10. The input device according to claim 1, wherein a width of the magnet in the direction in which the magnet moves is 1 mm or more and 5 mm or less.

11. The input device according to claim 1, wherein the sensor is a three-axis magnetic sensor capable of detecting magnetic fields in three axes.

12. The input device according to claim 1, wherein the sensor is arranged at a same height as that of the magnet in a height direction orthogonal to the first plane.

13. The input device according to claim 1, wherein at least a part of the sensor overlaps the magnet in a height direction orthogonal to the first plane.

14. The input device according to claim 1, wherein centers of the magnet and the sensor coincide with each other in a height direction orthogonal to the first plane.

15. The input device according to claim 1, further comprising:
a magnetic field generation unit provided above the sensor in a side view with respect to the first plane.

16. The input device according to claim 15, wherein a material of the magnetic field generation unit is a same as a material of the magnet.

17. The input device according to claim 15, wherein a magnetic field which is applied to the sensor by the magnetic field generation unit is greater than a magnetic field which is applied to the sensor by the magnet.

18. The input device according to claim 15, wherein a distance between the magnetic field generation unit and the sensor is smaller than a distance when the magnet and the sensor are closest to each other.

19. A controller comprising:
the input device according to claim 1.

20. The input device according to claim 1, wherein the first direction and the second direction are orthogonal to each other in the first plane.

21. The input device according to claim 1, wherein an angle formed by the first direction and the second direction in the first plane is an acute angle or an obtuse angle.

22. An error sensing method for an input device comprising a magnet that moves according to an operation of an operation unit and a sensor for detecting a magnetic field generated by the magnet, the error sensing method comprising:

operating the operation unit in a predetermined pattern;
    acquiring magnetic field data based on the predetermined pattern; and
    determining, based on the acquired magnetic field data, at least one of whether an orientation of the magnet is abnormal, whether an intensity of the magnet is abnormal, or whether a mounting error of the input device is within an allowable range.

* * * * *